(12) United States Patent
Kwon et al.

(10) Patent No.: US 9,674,547 B2
(45) Date of Patent: Jun. 6, 2017

(54) METHOD OF STABILIZING VIDEO, POST-PROCESSING CIRCUIT AND VIDEO DECODER INCLUDING THE SAME

(71) Applicant: SAMSUNG ELECTRONICS CO., LTD., Suwon-si, Gyeonggi-do (KR)

(72) Inventors: Nyeong-Kyu Kwon, Daejeon (KR); Yo-Won Jeong, Yongin-si (KR); Hideki Yamauchi, Seongnam-si (KR); Woong-Hee Lee, Hwaseong-si (KR); Young-Beom Jung, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 494 days.

(21) Appl. No.: 14/195,942

(22) Filed: Mar. 4, 2014

(65) Prior Publication Data
US 2014/0269923 A1 Sep. 18, 2014

(30) Foreign Application Priority Data

Mar. 15, 2013 (KR) ......................... 10-2013-0028249

(51) Int. Cl.
| | |
|---|---|
| *H04N 19/54* | (2014.01) |
| *H04N 19/117* | (2014.01) |
| *H04N 19/527* | (2014.01) |
| *H04N 19/85* | (2014.01) |
| *G02B 27/64* | (2006.01) |

(Continued)

(52) U.S. Cl.
CPC ........... *H04N 19/54* (2014.11); *G02B 27/646* (2013.01); *H04N 19/117* (2014.11); *H04N 19/154* (2014.11); *H04N 19/172* (2014.11); *H04N 19/198* (2014.11); *H04N 19/527* (2014.11); *H04N 19/85* (2014.11)

(58) Field of Classification Search
CPC ........... G02B 27/646; H04N 19/00684; H04N 19/00781; H04N 19/00915; H04N 19/117; H04N 19/154; H04N 19/172; H04N 19/198; H04N 19/527; H04N 19/54; H04N 19/85
USPC .................................. 375/240.16; 348/208.4
See application file for complete search history.

(56) References Cited

U.S. PATENT DOCUMENTS

| | | | | |
|---|---|---|---|---|
| 5,598,215 A | * | 1/1997 | Watanabe | ................. G06T 9/20 348/416.1 |
| 5,668,608 A | * | 9/1997 | Lee | ........................ H04N 19/54 235/494 |

(Continued)

FOREIGN PATENT DOCUMENTS

| | | | | |
|---|---|---|---|---|
| CN | 101951463 A | * | 1/2011 | |
| CN | 101951464 A | * | 1/2011 | |

(Continued)

*Primary Examiner* — Christopher S Kelley
*Assistant Examiner* — Kathleen Walsh
(74) *Attorney, Agent, or Firm* — F. Chau & Associates, LLC

(57) ABSTRACT

To stabilize video (an image sequence), reconstructed block data and decoding information of a video frame are received by unit of macroblock from a decoding circuit. Global affine parameters are determined and provided based on the reconstructed block data and the decoding information, and the global affine parameters represent an affine transform of a frame. Stabilized block data are provided based on the global affine parameters by compensating the reconstructed block data for an affine motion corresponding to the affine transform.

20 Claims, 22 Drawing Sheets

(51) Int. Cl.
*H04N 19/172* (2014.01)
*H04N 19/154* (2014.01)
*H04N 19/196* (2014.01)

(56) References Cited

U.S. PATENT DOCUMENTS

| | | | | |
|---|---|---|---|---|
| 5,978,030 A * | 11/1999 | Jung | | H04N 19/54 |
| | | | | 348/699 |
| 6,037,988 A * | 3/2000 | Gu | | H04N 19/56 |
| | | | | 375/240.16 |
| 6,084,912 A * | 7/2000 | Reitmeier | | H04N 19/503 |
| | | | | 348/699 |
| 6,285,711 B1 * | 9/2001 | Ratakonda | | H04N 19/533 |
| | | | | 375/240.15 |
| 6,785,333 B2 * | 8/2004 | Yoo | | H04N 19/537 |
| | | | | 375/240.16 |
| 7,010,045 B2 | 3/2006 | Lee | | |
| 7,016,544 B2 | 3/2006 | Boon | | |
| 7,567,617 B2 | 7/2009 | Holcomb | | |
| 7,831,065 B2 * | 11/2010 | Zimmermann | | G06T 7/206 |
| | | | | 375/362 |
| 8,477,848 B1 * | 7/2013 | Patankar | | H04N 7/014 |
| | | | | 375/240.16 |
| 8,494,051 B2 * | 7/2013 | Li | | 375/240.16 |
| 9,232,198 B2 * | 1/2016 | Sekiguchi | | H04N 7/24 |
| 2005/0094852 A1 * | 5/2005 | Kumar | | H04N 19/61 |
| | | | | 382/107 |
| 2005/0249426 A1 * | 11/2005 | Badawy | | G06T 9/001 |
| | | | | 382/241 |
| 2006/0072663 A1 | 4/2006 | Li et al. | | |
| 2006/0083407 A1 * | 4/2006 | Zimmermann | | G06T 7/206 |
| | | | | 382/107 |
| 2007/0041445 A1 * | 2/2007 | Chen | | H04N 19/527 |
| | | | | 375/240.16 |
| 2007/0206678 A1 * | 9/2007 | Kondo | | G06T 3/4053 |
| | | | | 375/240.17 |
| 2007/0297513 A1 * | 12/2007 | Biswas | | H04N 7/014 |
| | | | | 375/240.16 |
| 2007/0297645 A1 * | 12/2007 | Pace | | G06K 9/00711 |
| | | | | 382/103 |
| 2008/0025398 A1 | 1/2008 | Molloy et al. | | |
| 2008/0043848 A1 * | 2/2008 | Kuhn | | G06F 17/30811 |
| | | | | 375/240.16 |
| 2008/0152007 A1 * | 6/2008 | Sekiguchi | | H04N 7/24 |
| | | | | 375/240.14 |
| 2008/0159400 A1 * | 7/2008 | Lee | | H04N 19/52 |
| | | | | 375/240.16 |
| 2008/0240247 A1 * | 10/2008 | Lee | | H04N 19/52 |
| | | | | 375/240.16 |
| 2009/0257498 A1 * | 10/2009 | Kurata | | G06T 7/2026 |
| | | | | 375/240.16 |
| 2009/0278921 A1 * | 11/2009 | Wilson | | A61B 1/00177 |
| | | | | 348/77 |
| 2009/0285301 A1 * | 11/2009 | Kurata | | H04N 19/51 |
| | | | | 375/240.16 |
| 2010/0020244 A1 * | 1/2010 | Mitsuya | | G06T 7/2026 |
| | | | | 348/699 |
| 2010/0086050 A1 * | 4/2010 | Badawy | | G06K 9/001 |
| | | | | 375/240.16 |
| 2010/0329347 A1 * | 12/2010 | Kim | | H04N 19/139 |
| | | | | 375/240.16 |
| 2011/0103480 A1 * | 5/2011 | Dane | | H04N 19/513 |
| | | | | 375/240.16 |
| 2011/0116550 A1 | 5/2011 | Lee et al. | | |
| 2011/0150093 A1 * | 6/2011 | Mangiat | | G06T 5/003 |
| | | | | 375/240.16 |
| 2011/0176014 A1 * | 7/2011 | Hong | | H04N 5/145 |
| | | | | 348/208.4 |
| 2011/0193978 A1 * | 8/2011 | Wu | | H04N 5/23248 |
| | | | | 348/208.6 |
| 2012/0162450 A1 * | 6/2012 | Park | | H04N 5/145 |
| | | | | 348/208.4 |
| 2012/0169892 A1 * | 7/2012 | Numata | | H04N 5/23254 |
| | | | | 348/208.4 |
| 2012/0242870 A1 * | 9/2012 | Koizumi | | H04N 5/2258 |
| | | | | 348/241 |
| 2012/0294369 A1 * | 11/2012 | Bhagavathy | | H04N 19/119 |
| | | | | 375/240.16 |
| 2013/0027588 A1 * | 1/2013 | Ogawa | | H04N 5/23267 |
| | | | | 348/241 |

FOREIGN PATENT DOCUMENTS

| | | | |
|---|---|---|---|
| CN | 101951465 A | * | 1/2011 |
| JP | 2004-007804 | | 1/2004 |
| JP | 2005-166226 | | 6/2005 |
| JP | 2007-181226 | | 7/2007 |
| KR | 100181034 | | 12/1998 |
| KR | 1020000037945 | | 7/2000 |
| KR | 1020070053381 | | 5/2007 |
| KR | 1020100032235 | | 3/2010 |

* cited by examiner

FIG. 8
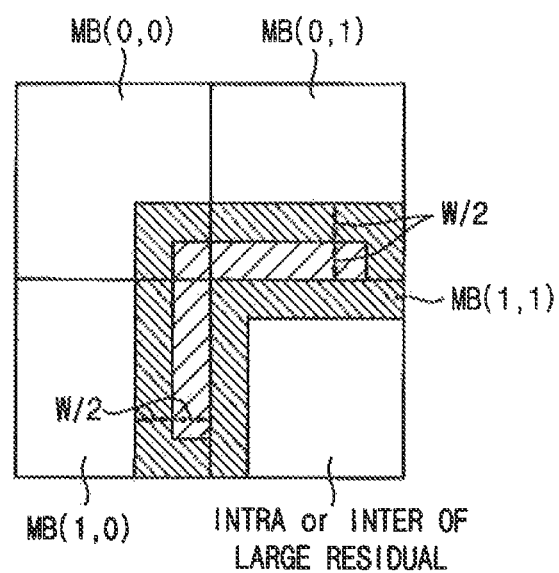
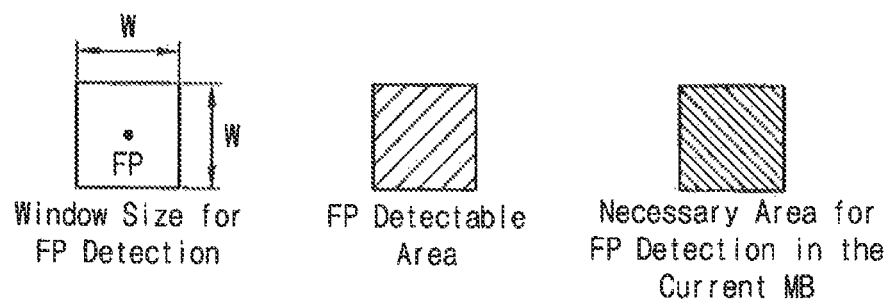

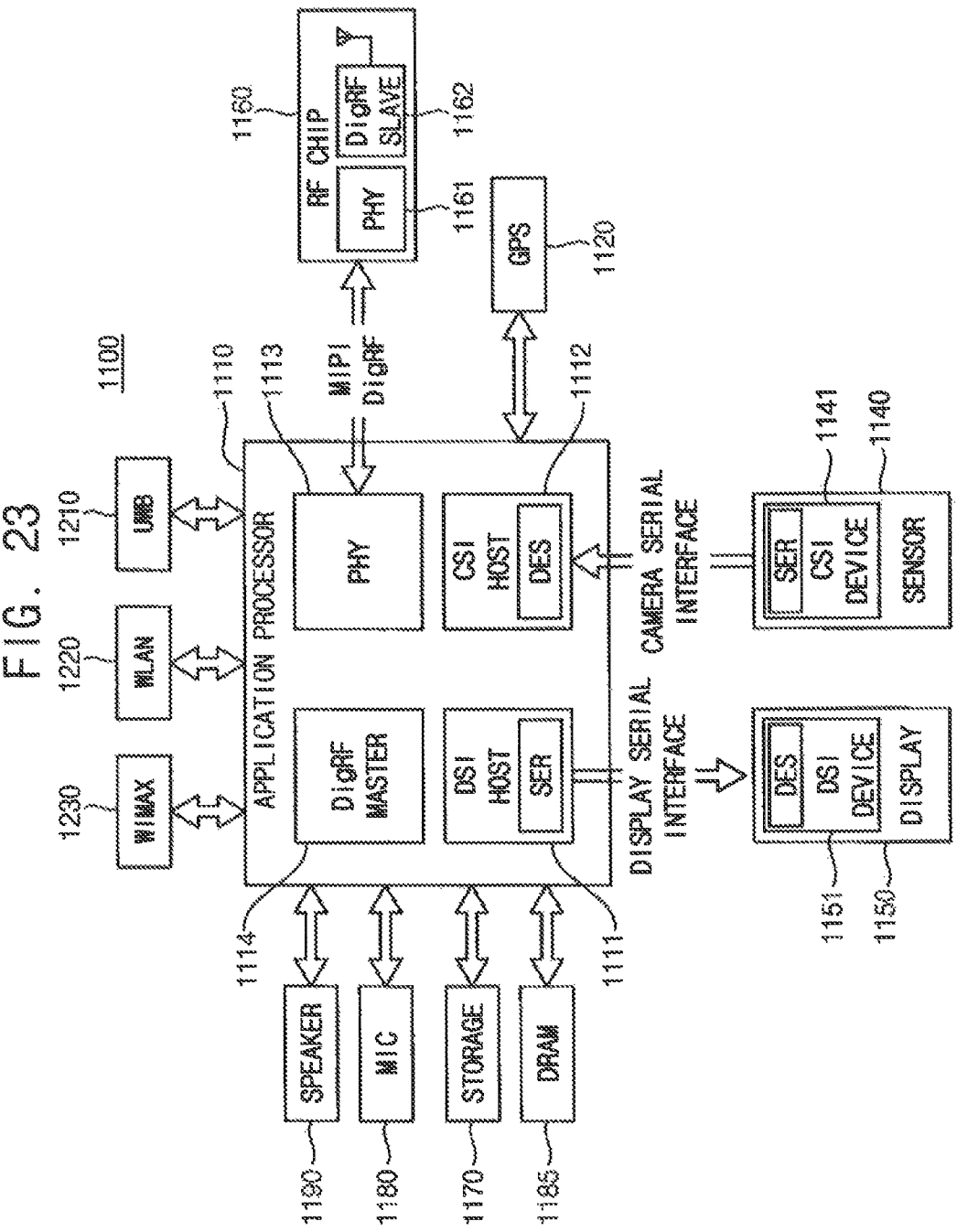

METHOD OF STABILIZING VIDEO, POST-PROCESSING CIRCUIT AND VIDEO DECODER INCLUDING THE SAME

CROSS-REFERENCE TO RELATED APPLICATION

This application claims priority under 35 USC §119 to Korean Patent Application No. 10-2013-0028249 filed on Mar. 15, 2013, the disclosure of which is incorporated by reference herein in its entirety.

TECHNICAL FIELD

Exemplary embodiments relate generally to processing of video data, and more particularly to a method of stabilizing video, a post-processing circuit and a video decoder to remove hand jitter noises.

DISCUSSION OF THE RELATED ART

MPEG (Moving Picture Expert Group) under ISO/IEC (International Organization for Standardization/International Electrotechnical Commission) and VCEG (Video Coding Expert Group) under ITU-T (International Telecommunications Union Telecommunication) are leading standards of video encoding. MPEG and VCEG have organized JVT (Joint Video Team) and the team has finished the H.264/AVC (Advanced Video Coding), the international standard of video encoding. Compared with the former standards of video codec such as MPEG-2, MPEG-4, H.261, H.263, etc., the H.264/AVC provides improved performance in compressing the video data by introducing functions such as variable block size motion estimation, ¼ pixel motion vector resolution, multiple reference picture motion estimation, etc.

Complexity of the encoder and the stream size of the encoded data are increased due to the added functions. The speed of processing data in a video decoder adopting the H.264 standard can be increased with the greater expense of operating conventional encoders at higher frequencies.

When video (i.e., sequence of images or frames of the same scene) is captured using an image capturing device, degradation of image quality may be caused by hand jitter (i.e., noise due to the movement of the user). In some conventional schemes, the hand jitter noise is compensated for through a pre-processing before compressing the captured video data. These schemes, however, may increase the amount of processed data and the complexity of required hardware and thus decrease the processing speed of the video decoder. In another conventional scheme, the hand jitter noises may be compensated for by analyzing a global motion vector. These schemes, however, may detect only a noise component corresponding to a translational movement and thus various types of the hand jitter noises are not removed.

SUMMARY

An aspect of the inventive concept provides a method of stabilizing video capable of efficiently detecting and compensating for hand jitter noises.

An aspect of the inventive concept provides a post-processing circuit capable of efficiently detecting and compensating for hand jitter noises using the results of decoding.

An aspect of the inventive concept provides a video decoder capable of efficiently detecting and compensating for hand jitter noises.

An aspect of the inventive concept provides a method of stabilizing video including the steps of, receiving reconstructed block data and decoding information of a video frame by unit of macroblock from a decoding circuit; providing global affine parameters based on the reconstructed block data and the decoding information, the global affine parameters representing an affine transform of a frame (image); and providing stabilized block data based on the global affine parameters by compensating the reconstructed block data for an affine motion corresponding to the affine transform.

The global affine parameters may represent the affine transform including all of a translation, a rotation and a scale change of the frame (image).

Providing the global affine parameters may include calculating point motion vectors of feature points based on the reconstructed block data and the decoding information, the feature points representing edges or corners of objects included in the frame (image); and determining the global affine parameters by unit of frame based on the point motion vectors.

The point motion vectors may be calculated by analyzing the reconstructed block data of a plurality of macroblocks in each frame according to a raster-scan order.

Calculating the point motion vectors may include detecting the feature points by analyzing the reconstructed block data; and calculating the point motion vectors of the feature points based on block motion vectors of macroblocks, the block motion vectors being included in the decoding information from the decoding circuit.

Detecting the feature points may include determining whether to perform the detection of the feature points with respect to each macroblock based on an encoding mode of each macroblock.

Determining whether to perform the detection of the feature points may include omitting the detection of the feature points with respect to the macroblock the encoding of which is an intra mode.

Determining whether to perform the detection of the feature points may include calculating a magnitude of residual block data of each macroblock of which the encoding mode is an inter mode, the residual block data being included in the decoding information; and omitting the detection of the feature points with respect to the macroblock when the magnitude of the residual block data of the macroblock is larger than a reference value.

Calculating the magnitude of the residual block data may include calculating absolute values of pixel data in the residual block data of each macroblock; and calculating a sum of the absolute values to determine the sum as the magnitude of the residual block data of each macroblock.

Calculating the point motion vectors may be omitted when a present frame corresponds to an intra frame.

Calculating the point motion vectors of the feature points may include with respect to each feature point included in a present macroblock, extracting the block motion vectors of the present macroblock and neighboring macroblocks adjacent to the present macroblock; calculating spatial weight values representing spatial correlation between each feature point and the extracted block motion vectors; and calculating a weighted average value of the extracted block motion vectors using the spatial weight values to determine the weighted average value as the point motion vector of each feature point.

The spatial weight values may be calculated as reciprocal values of distances between each feature point and center points of the reference macroblock and the neighboring macroblocks.

Calculating the point motion vectors of the feature points may include with respect to each feature point included in a present macroblock, extracting the block motion vectors of the present macroblock and neighboring macroblocks adjacent to the present macroblock; calculating temporal weight values representing temporal correlation between each feature point and the block motion vectors of the neighboring macroblocks; and calculating scaled block motion vectors by adjusting the extracted block motion vectors using the temporal weight values; calculating spatial weight values representing spatial correlation between each feature point and the extracted block motion vectors; and calculating a weighted average value of the scaled block motion vectors using the spatial weight values to determine the weighted average value as the point motion vector of each feature point.

The temporal weight values may be calculated as reciprocal values of differences between a frame number of a present frame including the present macroblock and frame number of other frames including the neighboring macroblocks.

Determining the global affine parameters by unit of frame may include grouping the feature points in a present frame into a plurality of point groups; determining a reference point group among the point groups based on the point motion vectors of the feature points; and calculating affine parameters of the present frame based on the point motion vectors of the feature points included in the reference point group.

Determining the reference point group may include calculating distribution values of the point groups, each distribution value representing direction and magnitude distribution of the point motion vectors of the feature points in each point group; comparing the distribution values with a reference value; and determining the point group as the reference point group when the distribution value of the point group is smaller than the reference value.

Determining the global affine parameters by unit of frame may further include providing the calculated affine parameters of the present frame as the global affine parameters for compensating the reconstructed block data of a next frame.

Determining the global affine parameters by unit of frame may further include estimating affine parameters based on the calculated affine parameters of the present frame and at least one previous frame; and providing the estimated affine parameters as the global affine parameters for compensating the reconstructed block data of a next frame.

Providing the stabilized block data may include calculating compensation affine parameters based on the global affine parameters, the compensation affine parameters representing an inverse transform of the affine transform represented by the global affine parameters; and calculating the stabilized block data based on the compensation affine parameters and the reconstructed block data.

Calculating the stabilized block data may include transforming pixel coordinates of pixels to compensation coordinates of the pixels based on the compensation affine parameters; and calculating each pixel data of the stabilized block data mapped to the pixel coordinates based on the reconstructed block data mapped to the compensation coordinates.

Calculating each pixel data of the stabilized block data may include setting a compensation group of neighboring pixels adjacent to each pixel; calculating weight values corresponding to reciprocal values of differences between the pixel coordinates of each pixel and the compensation coordinates of the neighboring pixels in the compensation group; and calculating a weighted average value of the reconstructed block data mapped to the compensation coordinates of the neighboring pixels in the compensation group to determine the weighted average value as the each pixel data of the stabilized block data mapped to the pixel coordinates.

An aspect of the inventive concept provides a video decoder that includes a decoding circuit configured to provide reconstructed block data and decoding information by unit of macroblock; and a post-processing circuit configured to determine global affine parameters based on the reconstructed block data and the decoding information, the global affine parameters representing an affine transform of a frame (image); and configured to provide stabilized block data based on the global affine parameters by compensating the reconstructed block data for an affine motion corresponding to the affine transform.

The post-processing circuit may include an affine motion estimation block configured to provide the global affine parameters based on the reconstructed block data and the decoding information; and a motion compensation block configured to provide stabilized block data based on the global affine parameters.

The affine motion estimation block may upgrade the global affine parameters by unit of frame.

Provision of the reconstructed block data from the decoding circuit and provision of the stabilized block data from the motion compensation block may be performed as pipe-lines processes by unit of macroblock.

An aspect of the inventive concept provides a post-processing unit of a video decoder that includes a feature point detection unit configured to detect feature points based on reconstructed block data and decoding information provided by unit of macroblock from a decoding circuit, the feature points representing edges or corners of objects included in a frame (image); a point vector calculation unit configured to calculate point motion vectors of the feature points based on block motion vectors of macroblocks, the block motion vectors being included in the decoding information; an affine parameter calculation unit configured to calculate affine parameters by unit of frame based on the point motion vectors; a trajectory unit configured to estimate global affine parameters based on the calculated affine parameters with respect to at least one frame, the global affine parameters representing an affine transform of the frame (image); and an affine motion compensation unit configured to provide stabilized block data based on the global affine parameters by compensating the reconstructed block data for an affine motion corresponding to the affine transform.

Various exemplary embodiments will be described more fully hereinafter with reference to the accompanying drawings, in which some exemplary embodiments are shown. The inventive concept may, however, be embodied in many different forms and should not be construed as limited to the exemplary embodiments set forth herein. Rather, these exemplary embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular exemplary embodiments only and is not intended to be limiting of the present inventive concept. As used herein, the singular forms "a," "an" and "the" are intended to include the plural forms as well, unless the context clearly indicates otherwise.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

BRIEF DESCRIPTION OF THE DRAWINGS

Exemplary embodiments of the inventive concept will be more clearly understood from the following detailed description taken in conjunction with the accompanying drawings, in which:

FIG. 8 is a diagram for describing a decided omission of detecting feature points according to an exemplary embodiment of the inventive concept;

FIG. 23 is a block diagram of an interface employable in the computing system of FIG. 22 according to an exemplary embodiment of the inventive concept.

DETAILED DESCRIPTION OF THE EXEMPLARY EMBODIMENTS

Figure 1:
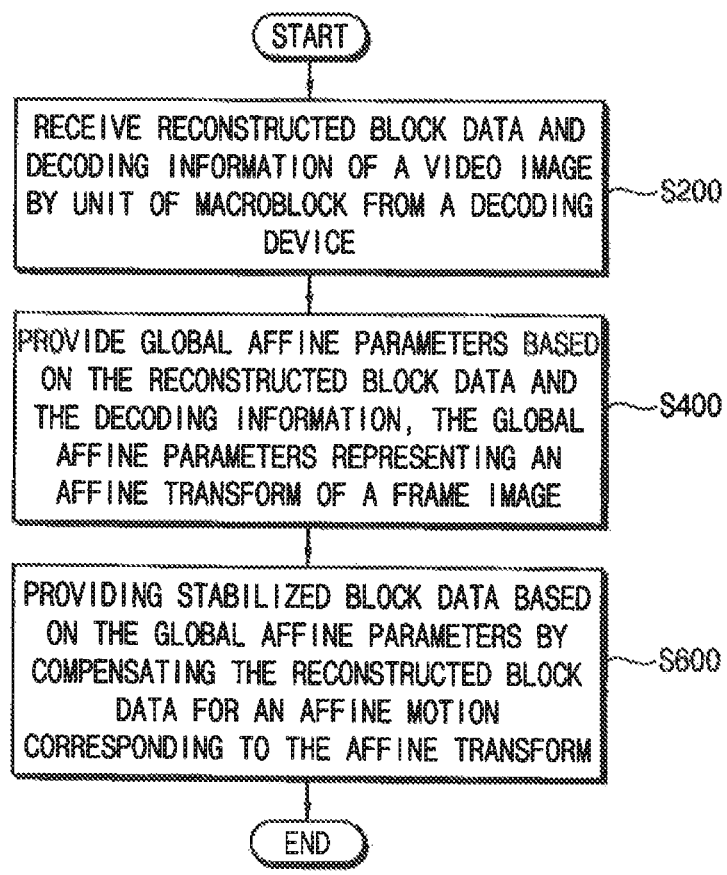
FIG. 1 is a flow chart illustrating a method of stabilizing video according to an exemplary embodiment of the inventive concept.
Figure 2:
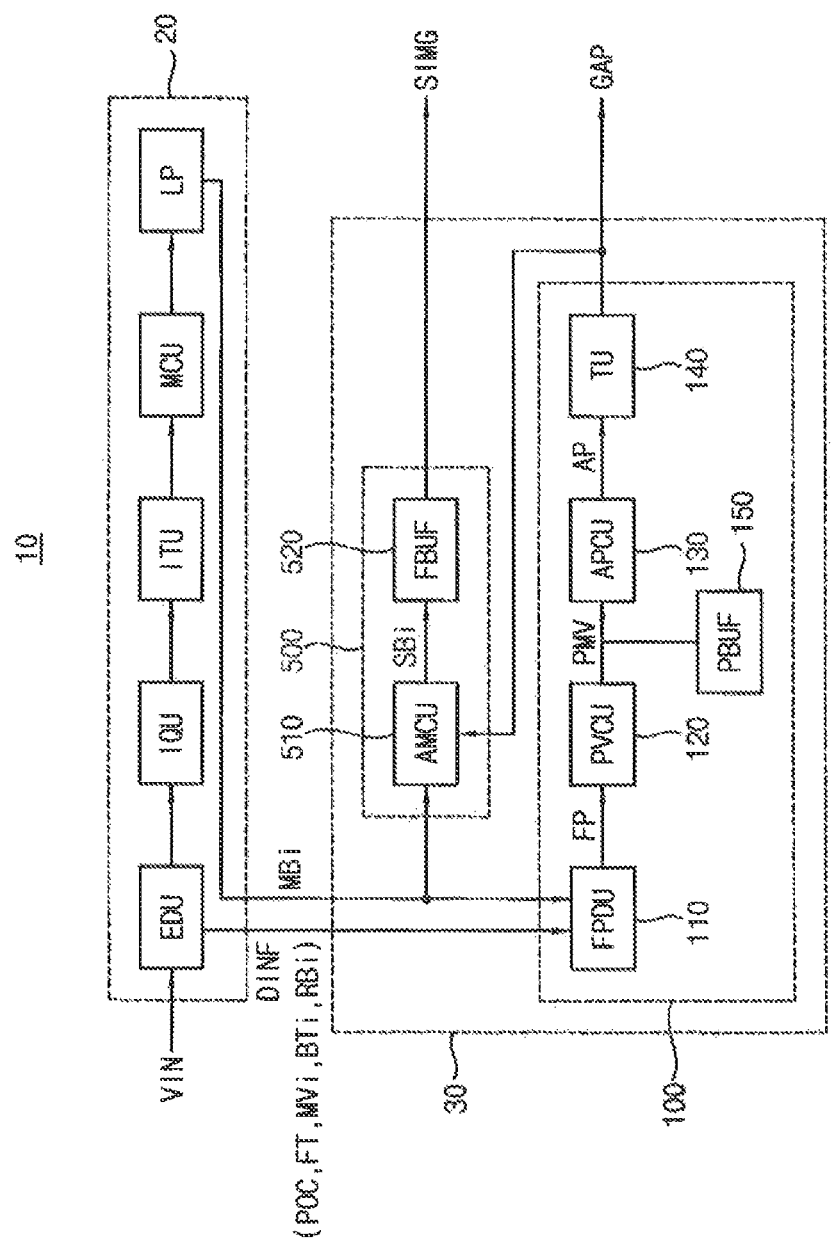
FIG. 2 is a block diagram illustrating a video decoder according to an exemplary embodiment of the inventive concept.

FIG. 1 is a flow chart illustrating a method of stabilizing video frames according to an exemplary embodiment of the inventive concept, and FIG. 2 is a block diagram illustrating a video decoder configured to perform the method according to an exemplary embodiment of the inventive concept.

Referring to FIG. 2, a video decoder 10 according to an exemplary embodiment of the inventive concept includes a decoding circuit 20 and a post-processing circuit 30. The post-processing circuit 30 includes a motion compensation block 500 and an affine motion estimation block 100.

Referring to FIGS. 1 and 2, the post-processing circuit 30 in the video decoder 10 receives (S200) reconstructed block data MBi and decoding information DINF of a video frame (frame) in units of macroblock size from a decoding circuit 20 in the video decoder 10. In this disclosure, the macroblock is not limited to a macroblock specified by particular standards, and the macro block may indicate an arbitrary unit of decoded data, and preferably is a square or a square-ish rectangular array of pixels adjacent or proximal to each other.

The affine motion estimation block 100 in the post-processing circuit 30 provides (S400) global affine parameters GAP based on the reconstructed block data MBi and the decoding information DINF where the global affine parameters GAP represent an affine transform of the video frame (image).

The motion compensation block 500 in the post-processing circuit 30 provides (S600) stabilized block data SBi based on the global affine parameters GAP by compensating the reconstructed block data MBi for an affine motion corresponding to the affine transform.

As illustrated in FIG. 2, the decoding circuit 20 includes an entropy decoding unit EDU, an inverse quantization unit IQU, an inverse transformation unit ITU, a motion compensation unit MCU and a loop filter LP.

The entropy decoding unit EDU parses an input video stream VIN to separate decoding information DINF and image information. For example, the entropy decoding unit EDU may include a variable length decoder (VLD). The decoding information DINF is provided to the post-processing circuit 30 according to an exemplary embodiment of the inventive concept. The decoding information DINF may include at least a picture order count POC (see e.g., FIG. 12) indicating a serial number (index number from 1 to N) of the frame, a frame type FT (see e.g., I, B, P in FIGS. 12 & 13) indicating the selected encoding mode of the frame, a motion vector Vi of each macroblock and residual block data RBi. The inverse quantization unit IQU and the inverse transformation unit ITU are used to decode the loss-encoded data inversely to restore the reconstructed picture. The inverse quantization unit IQU inversely-quantizes the data quantized by the encoding device. The inverse transformation unit ITU performs an inverse-transform on the output of the inverse quantization unit IQU. The motion compensation unit MCU compensates the current frame picture based on additional information and based on a reference frame stored in a frame memory to output the motion-compensated data. The loop filter LP filters the motion-compensated data to output the reconstructed data. Likewise, such decoding processes are performed upon portions of the frame of macroblock size, and the decoding circuit 20 provides the reconstructed block data MBi and the decoding information DINF by unit of macroblock. A portion of the decoding information DINF may be provided per unit of a whole frame.

The post-processing circuit 30 includes the affine motion estimation block 100 and the motion compensation unit 500. The affine motion estimation block 100 determines and provides the global affine parameters GAP based on the reconstructed block data MBi and the decoding information DINF. The motion compensation block 500 provides stabilized block data SBi based on the global affine parameters GAP by compensating the reconstructed block data MBi for an affine motion corresponding to the determined affine transform.

The motion compensation block 100 includes a feature point detection unit (FPDU) 110, a point vector calculation unit (PVCU) 120, an affine parameter calculation unit (APCU) 130 and a trajectory unit (TU) 140.

The feature point detection unit 110 detects feature points FP based on reconstructed block data MBi and decoding information DINF provided by unit of macroblock from the decoding circuit 20, where the feature points FP represent edges or corners of objects included in a frame (image). The point vector calculation unit 120 may calculate point motion vectors PMV of the feature points FP based on block motion vectors MVi of macroblocks, where the block motion vectors MVi are included in the decoding information DINF. The affine parameter calculation unit 130 calculates affine parameters AP by unit of one whole frame based on the point motion vectors PMV. The trajectory unit 140 estimates the global affine parameters GAP based on the calculated affine parameters AP with respect to at least one frame, where the global affine parameters GAP represent the affine transform of the frame (image).

The motion compensation block 500 includes an affine motion compensation unit (AMCU) 510 and a frame buffer (FBUF) 520. The affine motion compensation unit 510 provides the stabilized block data SBi based on the global affine parameters GAP by compensating the reconstructed block data MBi for the affine motion corresponding to the affine transform represented by the global affine parameters GAP. The stabilized block data SBi may be stored in the frame buffer 520 to be output as stabilized image data SIMG.

The global affine parameters GAP represent the affine transform including all of a translation, a rotation and a scale change of the frame (image). As such, the quality of the video image may be enhanced by detecting feature points FP and determining the global affine parameters GAP to compensate for a detected jitter motion.

Figure 3:
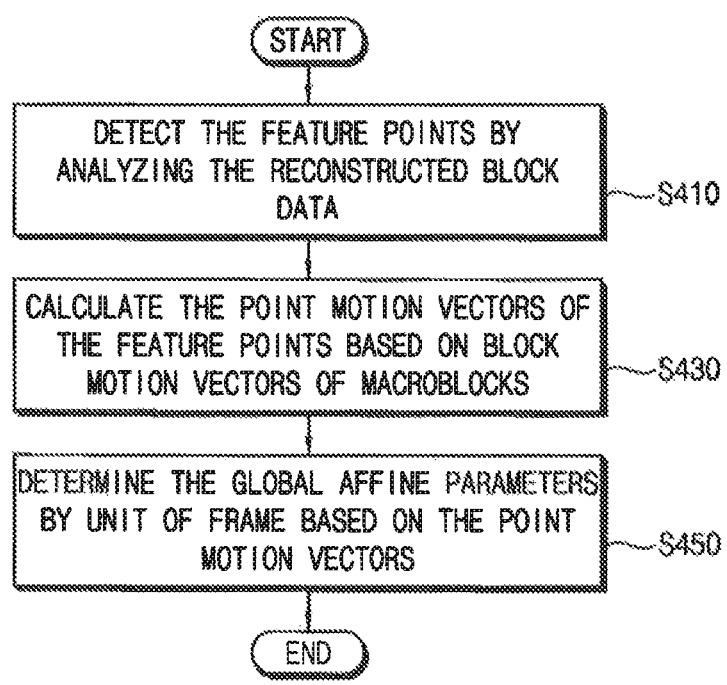
FIG. 3 is a flow chart illustrating a method of determining global affine parameters GAP according to an exemplary embodiment of the inventive concept.

FIG. 3 is a flow chart illustrating a method of determining global affine parameters GAP according to an exemplary embodiment of the inventive concept.

Referring to FIGS. 2 and 3, the feature point detection unit 110 and the point vector calculation unit 120 calculate point motion vectors PMV of feature points FP based on the reconstructed block data MBi and the decoding information DINF, where the feature points FP represent edges or corners of objects included in the frame (image). The feature point detection unit 110 detects the feature points FP by analyzing the reconstructed block data MBi (S410). And the point vector calculation unit 120 calculates the point motion vectors PMV of the feature points FP based on block motion vectors MVi of macroblocks (S430), where the block motion vectors MVi are included in the decoding information DINF from the decoding circuit 20. In an exemplary embodiment, the detection of the feature points FP and the calculation of the point motion vectors PMV may be performed together by unit of macroblock. In another exemplary embodiment, the detection of the feature points FP may be performed throughout the one whole frame and then the point motion vectors PMV may be calculated sequentially with respect to the feature points FP in the one frame. The detection of the feature points FP and the calculation of the point motion vectors PMV may be performed in the raster-scan order as will be described with reference to FIGS. 4, 5 and 6.

The affine parameter calculation unit 130 and the trajectory unit 140 may determine the global affine parameters GAP by unit of a whole frame based on the point motion vectors PMV (S450).

Figure 4:
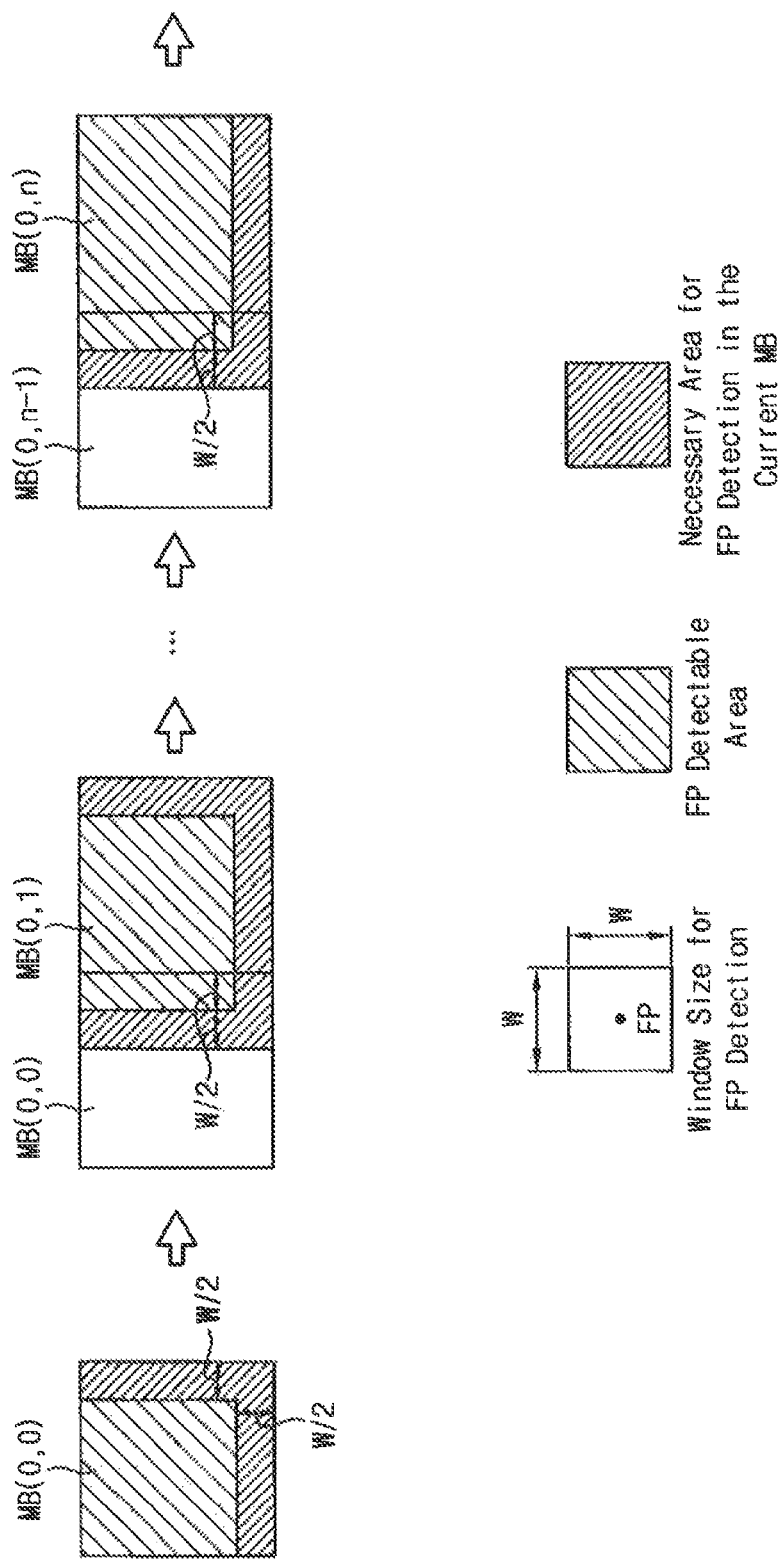
FIGS. 4, 5 and 6 are diagrams of portions of a video frame for describing a raster-scan-based scheme for detecting feature points and/or for calculating point motion vectors according to an exemplary embodiment of the inventive concept.
Figure 5:
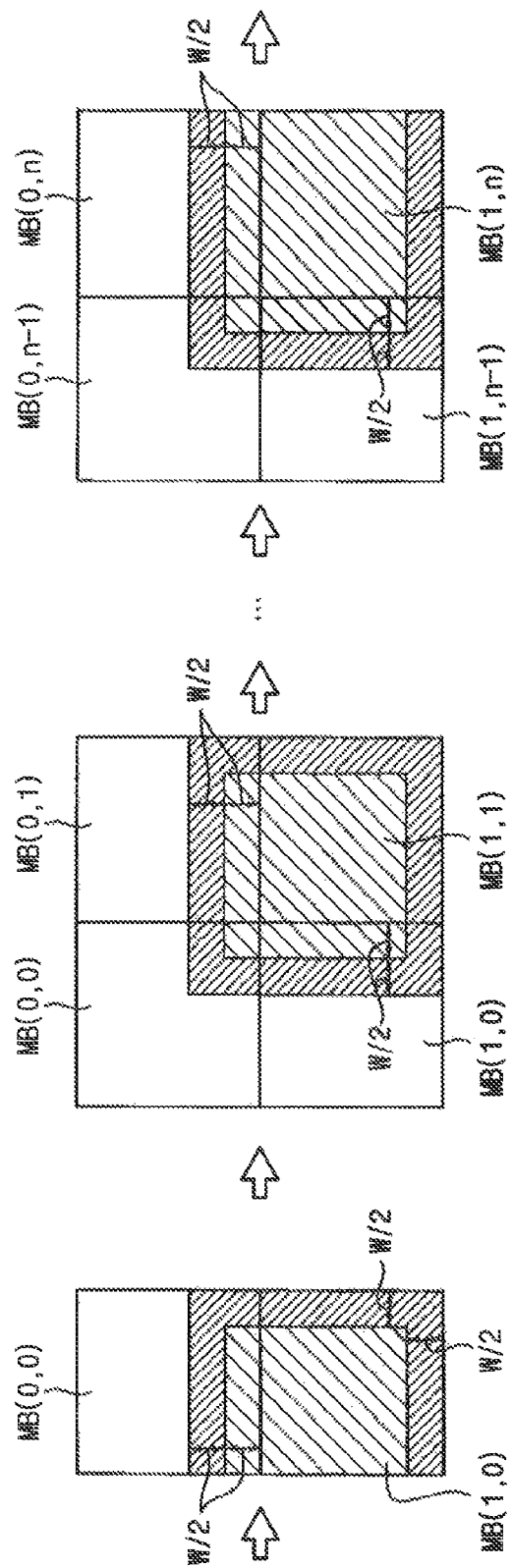
Figure 6:
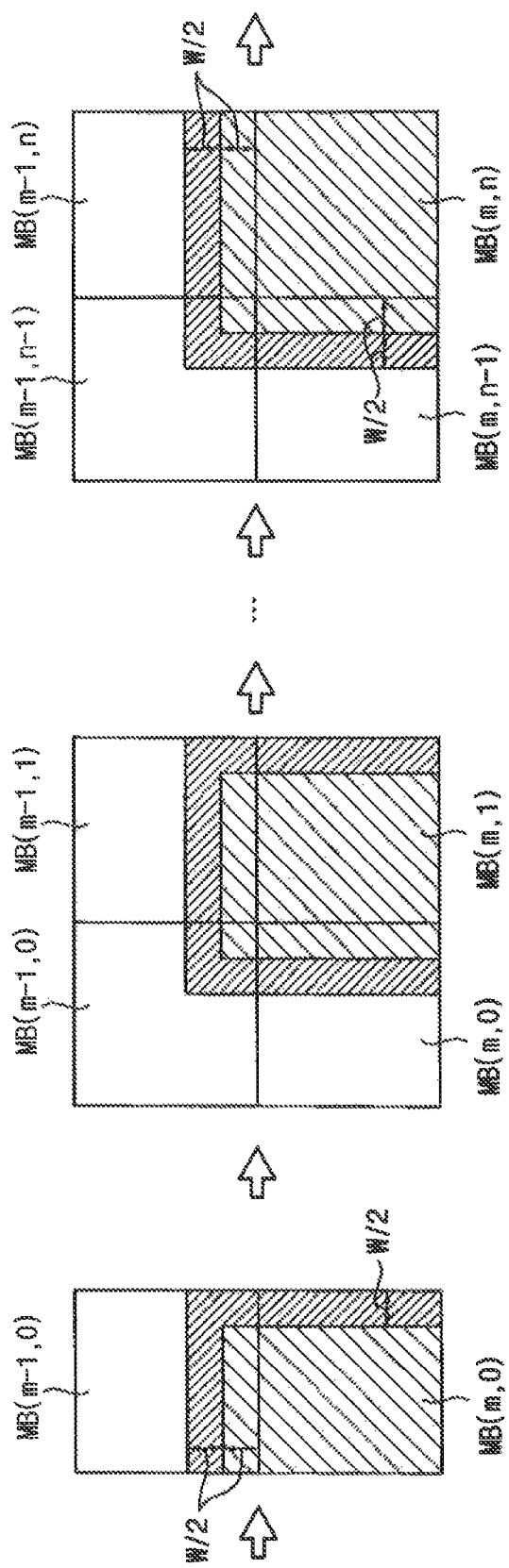

FIGS. 4, 5 and 6 are diagrams of portions of a video frame for describing a raster-scan-based scheme for detecting feature points and/or calculating their point motion vectors according to an exemplary embodiment of the inventive concept.

FIG. 4 illustrates the detection of the feature points FP with respect to the macroblocks MB(0, 0) to MB(0, n) in the first row of the frame (a frame that includes m×n macroblocks, where each of m and n is an integer greater than one). FIG. 5 illustrates the detection of the feature points FP with respect to the macroblocks MB(1, 0) to MB(1, n) in the second row of the frame. FIG. 6 illustrates the detection of the feature points FP with respect to the macroblocks MB(m, 0) to MB(m, n) in the last row of the frame.

As illustrated in FIGS. 4, 5 and 6, the detection of the feature points FP and the calculation of the point motion vectors PMV of the detected feature points FP may be performed by analyzing the reconstructed block data MBi of the plurality of m×n macroblocks in each frame in the raster-scan order. In the raster-scan order, the macro blocks are scanned and analyzed from the first macroblock MB(0, 0) to the last macroblock MB(m, n), from left to right in each row and from the first row and to the last row. The detection of the feature points FP may be performed using various conventional edge or corner detection methods. The calculation of the point motion vectors PMV is further described with reference to FIG. 10.

The detection of the feature points FP may be performed based in part on the pixel data of the neighboring points or neighboring macroblocks. And thus, as indicated in the key at bottom of FIG. 4, a window of a predetermined size W×W may be set. The dimension W is greater than the side dimension of a macroblock. Even though all of the reconstructed block data of the current macroblock are received, the FP detectable area may be limited to a portion of the current macroblock and the analysis for the other portion of the current macroblock may be delayed until the data of the next neighboring macroblocks are received.

Figure 7:
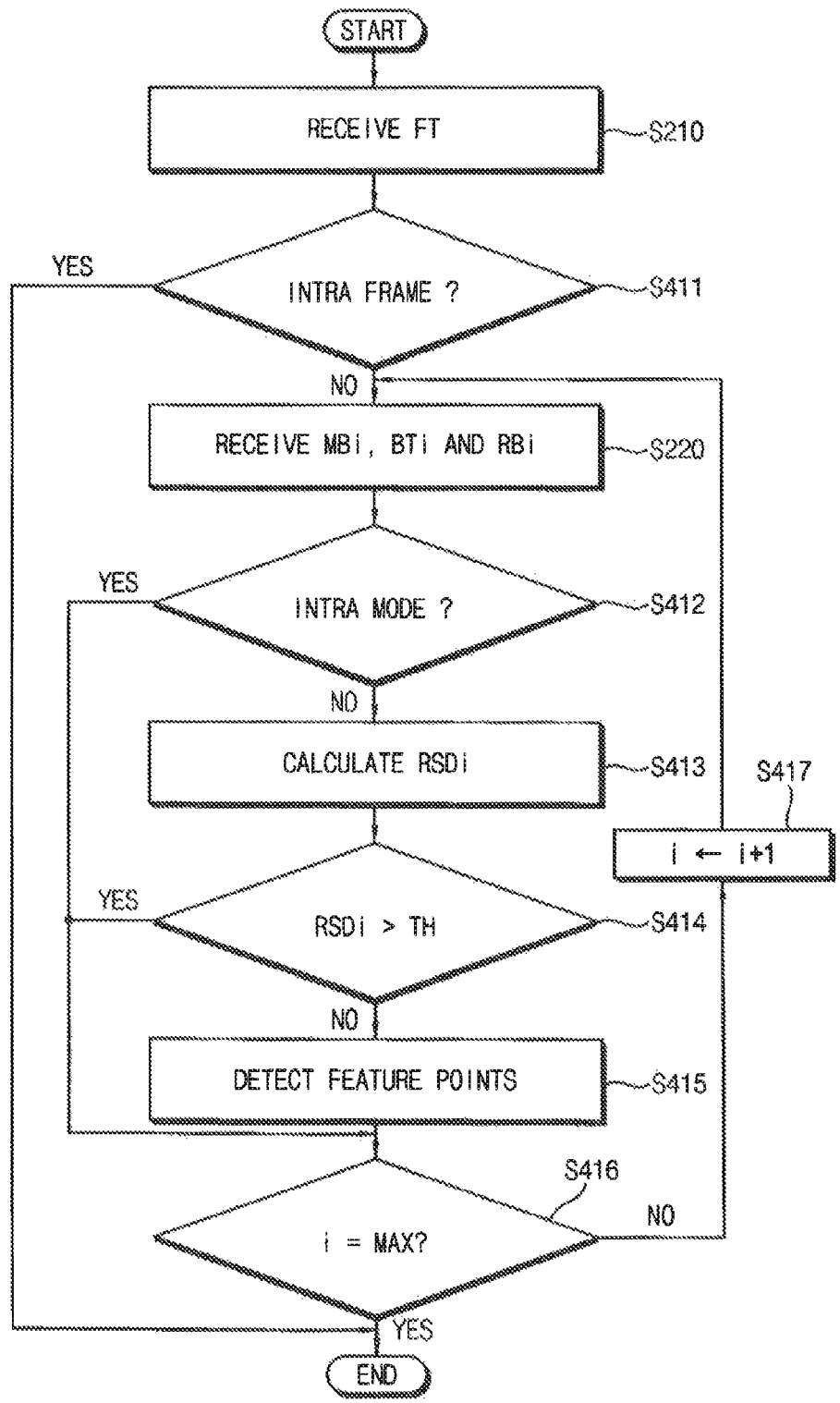
FIG. 7 is a flow chart illustrating a method of determining whether to perform detection of feature points according to an exemplary embodiment of the inventive concept.

FIG. 7 is a flow chart illustrating a method of determining whether to perform detection of feature points according to an exemplary embodiment of the inventive concept.

FIG. 7 illustrates a method of determining whether to perform detection of feature points with respect to one frame. The same processes may be performed sequentially with respect to each of a plurality of frames that are decoded sequentially.

Referring to FIGS. 2 and 7, the point detection unit 110 receives (S210) a frame type FT indicating the encoding mode of the present frame or the current frame from the decoding circuit 20. Each frame may be deemed as one of an intra frame (I frame) type, a predictive frame (P frame) type and a bi-directional predictive frame (B frame) type by the frame type FT. Each intra (I) frame is encoded and decoded without referring to other frames, each P frame is encoded and decoded with reference to at least one of a previous frame and each B frame is encoded and decoded with reference to at least one of previous and next frames.

The point detection unit 110 determines whether the present frame is an I frame based on the frame type FT (S411). If the present frame is an I frame (S411: YES), then the detection of the feature points (S415) and the calculation of the point motion vectors may be omitted. If the present frame is not an I frame (S411: NO), (i.e., when the present frame is the P frame or the B frame), then the point detection unit 110 receives the reconstructed block data MBi, the block type BTi and the residual block data RBi of the present macroblock (5220). The point detection unit 100 next determines whether the encoding mode of the present macroblock is the intra mode based on the block type BTi (S412). If the encoding mode of the present macroblock is the intra mode (S412: YES), then the detection of the feature points (S415) and the calculation of the point motion vectors may be omitted. If the encoding mode of the present macroblock is not the intra mode (S412: NO), (i.e., when the encoding mode of the present macroblock is the inter mode), the point detection unit 110 calculates the magnitude RSDi of the residual block data RBi of the present macroblock (S413). For example, the point detection unit 110 may calculate absolute values of pixel data in the residual block data of the present macroblock and calculate the sum of the absolute values to determine the sum as the magnitude of the residual block data of the present macroblock.

The point detection unit 110 compares the magnitude RSDi of the residual block data RBi with a reference value TH (S414). If the magnitude RSDi of the residual block data RBi of the present macroblock is larger than the reference value TH (S414: YES), then the detection of the feature points and the calculation of the point motion vectors may be omitted. If the magnitude RSDi of the residual block data RBi of the present macroblock is equal to or smaller than the reference value TH (S414: NO), then the point detection unit 110 performs the detection of the feature points and the calculation of the point motion vectors as described above. The above processes are repeated with the next macroblock (S417) until all of the macroblocks in the present frame have been analyzed (S416: YES).

As such, the detection of the feature points and/or the calculation of the motion vectors may be performed selectively based on the frame type FT indicating the encoding mode of the present frame and based on the block type BTi indicating the encoding mode of the present macroblock, which are included in the decoding information DINF from the decoding circuit 20.

FIG. 8 is a diagram for describing a decided omission of detecting feature points according to an exemplary embodiment of the inventive concept.

When the macroblock MB(1, 1) in FIG. 8 is the intra block or when the macroblock MB(1, 1) is the inter block having relatively a large magnitude RDSi of the residual block data, the calculated value of the feature point motion vector PMV may not be trusted. In this case, the detection of the feature points FP and the calculation of the point motion vectors PMV may be omitted with respect to the macroblock MB(1, 1) as described with reference to FIG. 7. As such, the calculation amount of the processed data may be reduced by omitting the detection of the feature points FP and the calculation of the point motion vectors PMV with respect to the I frame, the intra macroblocks and some inter macroblocks, thereby increasing the operational speed of the post-processing circuit and the video decoder including the post-processing circuit.

Figure 9:
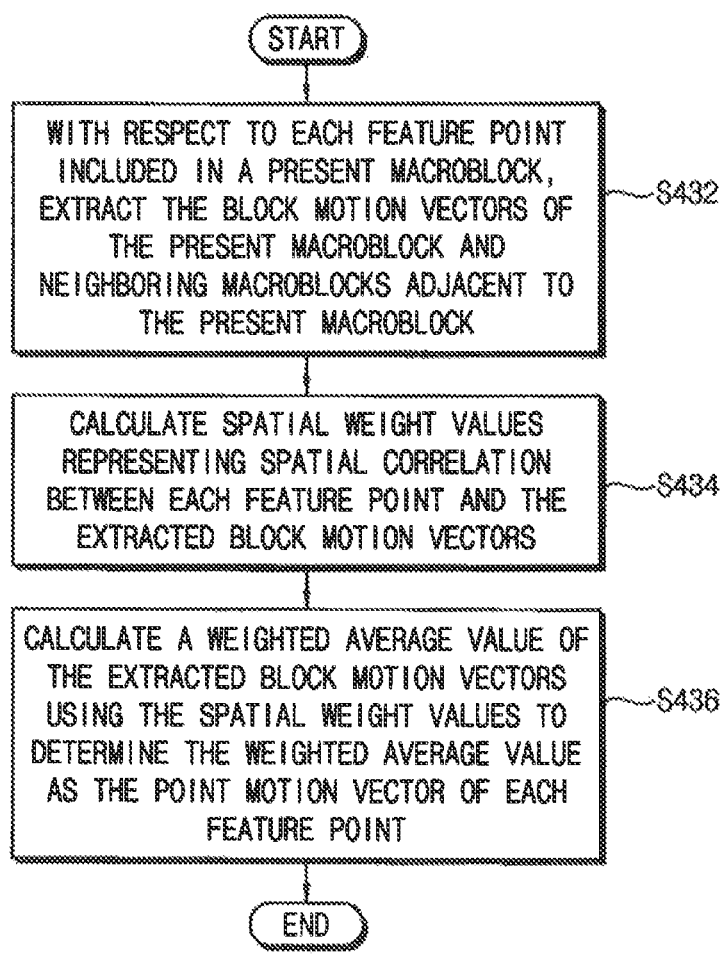
FIG. 9 is a flow chart illustrating a method of calculating feature point motion vectors using spatial weight values according to an exemplary embodiment of the inventive concept.
Figure 10:
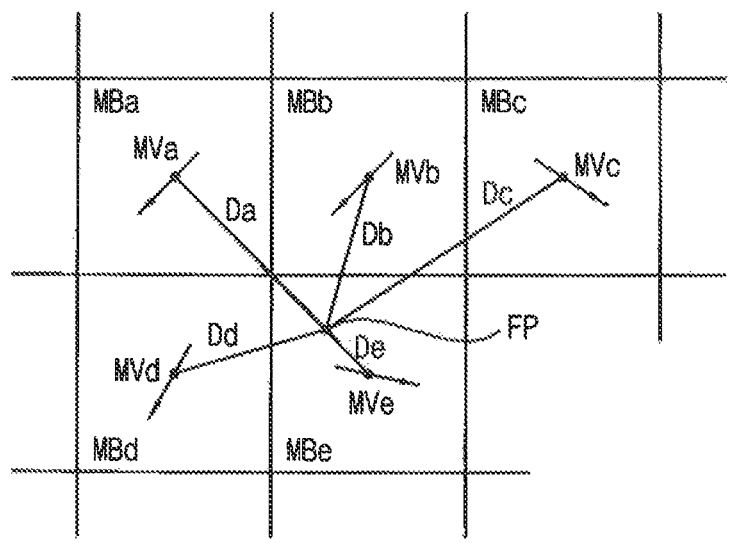
FIG. 10 is a diagram for describing an example of spatial weight values used in the method of FIG. 9.

FIG. 9 is a flow chart illustrating a method of calculating feature point motion vectors using spatial weight values according to an exemplary embodiment of the inventive concept, and FIG. 10 is a diagram for describing an example of spatial weight values used in the method of FIG. 9.

Referring to FIGS. 2, 9 and 10, with respect to each feature point FP included in a present macroblock MBe, the vector calculation unit 120 extracts the block motion vectors Mve, MVa, MVb, MVc, and MVd of the present macroblock MBe and neighboring macroblocks MBa, MBb, MBc and MBd adjacent to the present macroblock MBe (S432). The set of the neighboring macroblocks MBa, MBb, MBc and MBd is an example that is compatible with the raster-scan scheme as described with reference to FIGS. 4, 5 and 6. The set of the neighboring macroblocks may be varied according to the scanning scheme for detecting the feature points.

The block motion vector MVi may be provided in forms of a predictive motion vector (PMVi) and a motion vector difference MVDi. The macroblock of the skip mode satisfies MVi=PMVi and the macroblock of the inter mode satisfies MVi=MVDi+PMVi.

The vector calculation unit 120 calculates spatial weight values Wa, Wb, Wc, Wd and We representing spatial correlation between each feature point FP and the extracted block motion vectors MVa, MVb, MVc, MVd and MVe (S434). For example, the spatial weight values Wa, Wb, Wc, Wd and We may be calculated as reciprocal values Wa=1/Da, Wb=1/Db, Wc=1/Dc, Wd=1/Dd and We=1/De of distances Da, Db, Dc, Dd and De between each feature point FP and center points of the reference macroblock and of the neighboring macroblocks.

The vector calculation unit 120 calculates a weighted average value (Wa*MVa+Wb*MVb+Wc*MVc+ Wd*MVd+We*MVe)/(Wa+Wb+Wc+Wd+We) of the extracted block motion vectors MVa, MVb, MVc, MVd and MVe using the spatial weight values Wa, Wb, We, Wd and We to determine the weighted average value as the point motion vector PMV of each feature point (S436).

Figure 11:
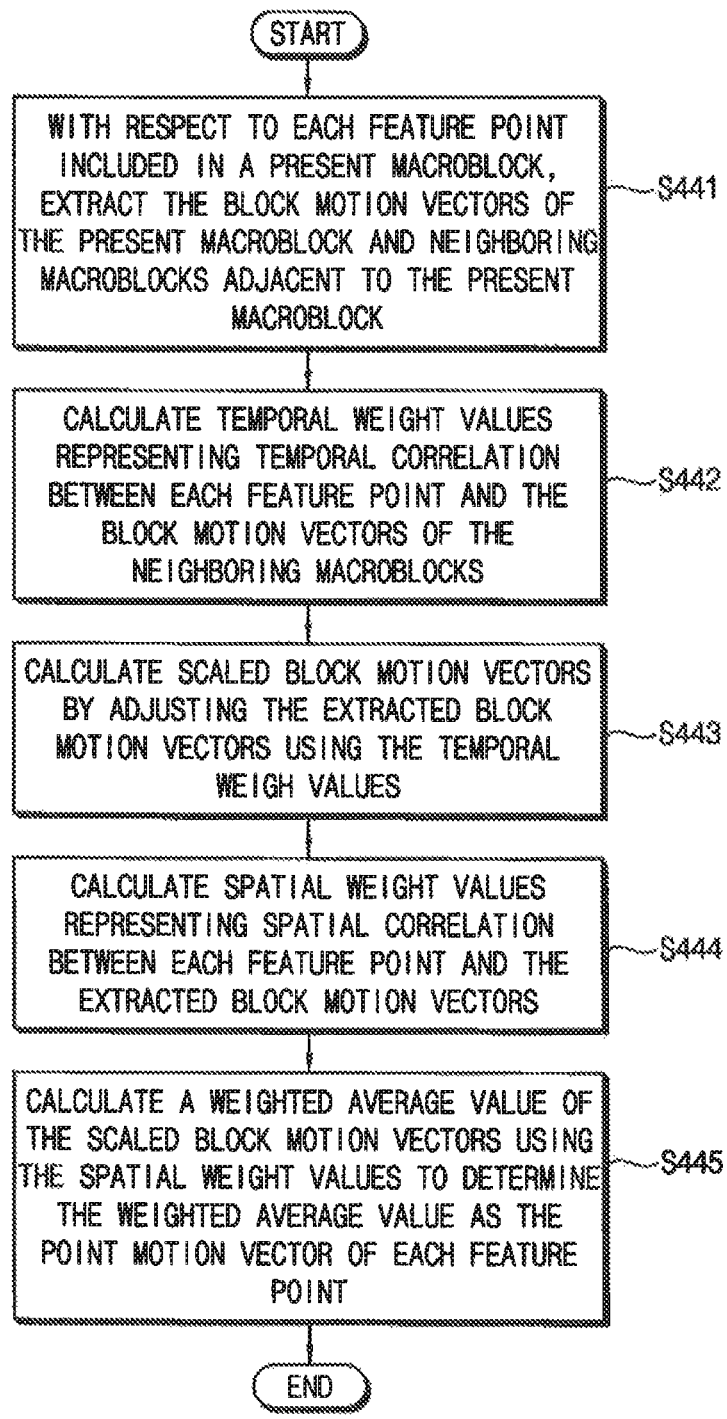
FIG. 11 is a flow chart illustrating a method of calculating point motion vectors using temporal weight values and spatial weight values according to an exemplary embodiment of the inventive concept.
Figure 12:
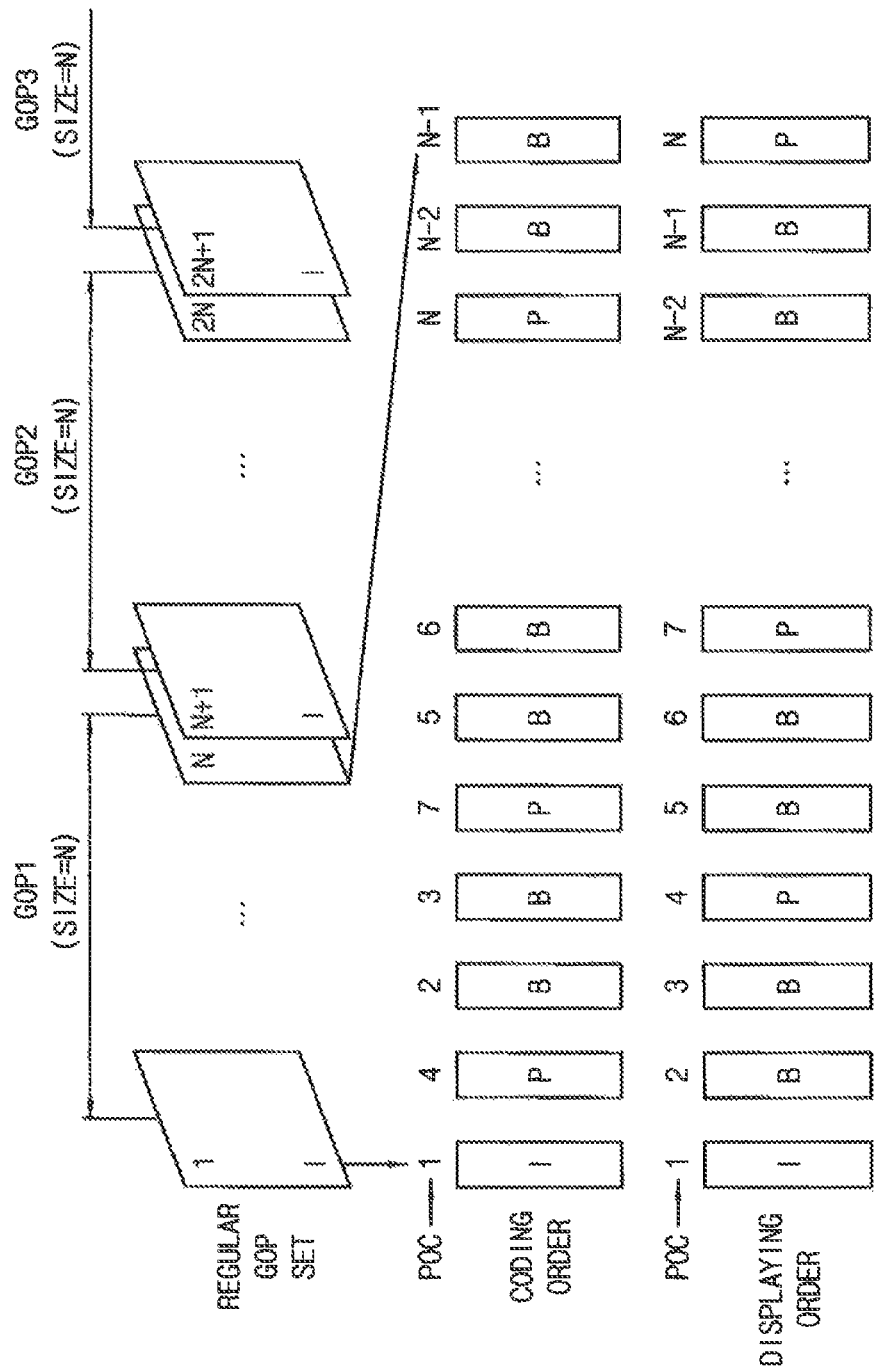
FIG. 12 is a diagram illustrating an example of groups of pictures (GOPs) that are set regularly.
Figure 13:
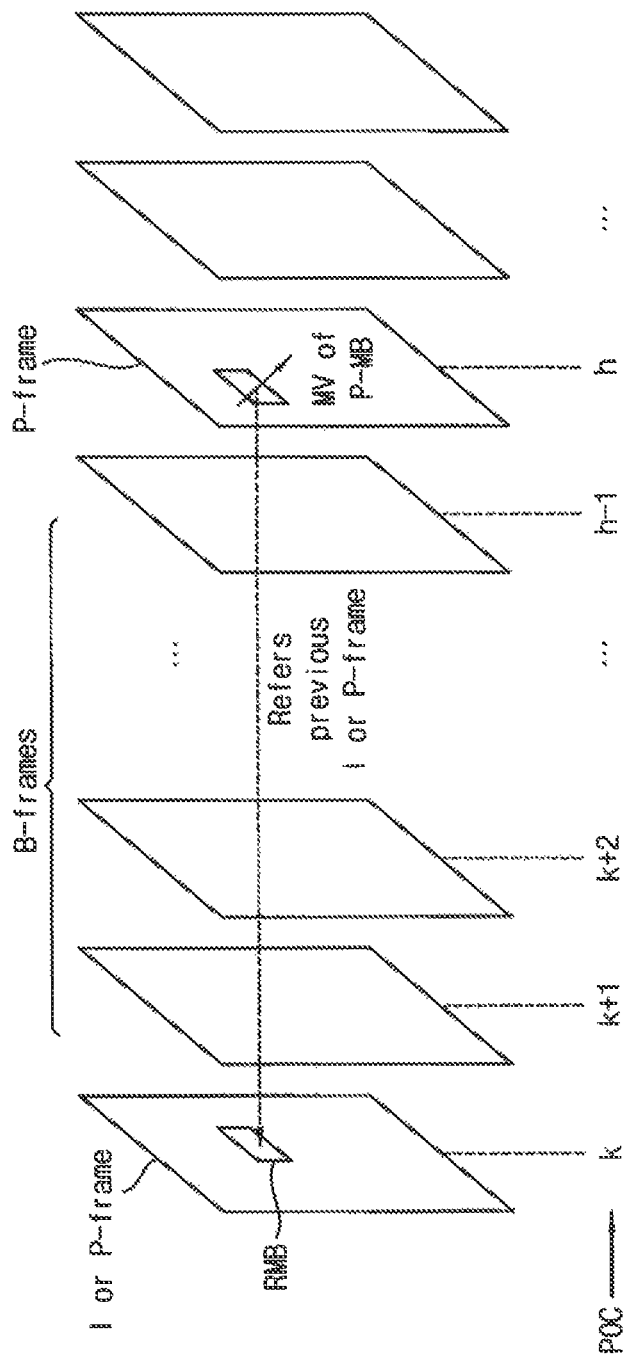
FIGS. 13 and 14 are diagrams for describing an example of temporal weight values used in the method of FIG. 11.
Figure 14:
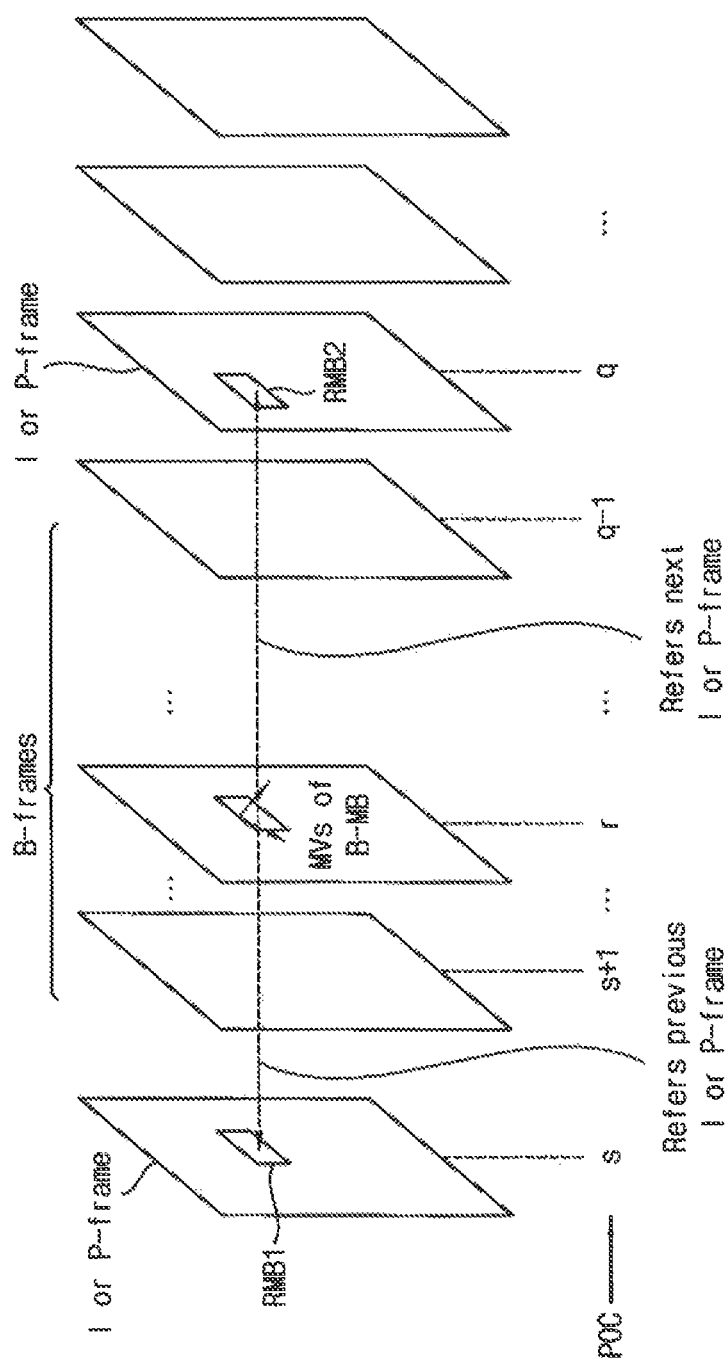

FIG. 11 is a flow chart illustrating a method of calculating point motion vectors using temporal weight values and spatial weight values according to an exemplary embodiment of the inventive concept, FIG. 12 is a diagram illustrating an example of groups of pictures (GOPs) that are set regularly, and FIGS. 13 and 14 are diagrams for describing an example of temporal weight values used in the method of FIG. 11.

Firstly setting of the frame type is described with reference to FIG. 11. Even though FIG. 11 illustrates regular setting of the GOPs with a normal size N by regularly assigning the I pictures, the size and structure of the GOPs may be set irregularly. In this disclosure, the picture may correspond to a frame in progressive scan scheme or a field in an interlaced scan scheme.

The size of the GOP may be determined by the interval of the assigned I pictures and the structure of the GOP may be determined by the arrangement of the assigned P and/or B pictures. The bit number of the encoded data may be reduced by the proper arrangement of the P and/or B pictures. Thus, the inter pictures that are encoded with reference to the other pictures, and error propagation through the successive inter pictures may be prevented by limiting the size of the GOP, e.g., by regularly or irregularly assigning the I pictures that are encoded without referring to the other pictures.

The picture order count POC in FIG. 12 represents the display order and the display order may be different from the coding order depending on the structure of the GOP. A first picture (assigned as the I picture) through an N-th picture form a first picture group GOP1. And an N+1-th picture (assigned as the next I picture) through a 2N-th picture form a second picture group GOP2. In the same way, N pictures from a 2N+1-th picture form a third picture group GOP3.

The display order may be different from the coding order because the reference pictures are varied depending on the picture type. For example, the fourth picture of the P type has to be decoded before the second and third pictures of the B type and then the second and third pictures may be decoded with reference to the decoded fourth picture.

According to H.264 standard, the available encoding modes or decoding modes of the macroblock may be divided largely into the inter mode and the intra mode. The inter mode may include the five motion compensation modes of skip, 16*16, 8*16, 16*8 and 8*8. And the 8*8 motion compensation mode may include the three sub-modes of 8*4, 4*8 and 4*4 with respect to each 8*8 sub-block. The intra mode may include the four 16*16 intra prediction modes and the nine 4*4 intra prediction modes.

Referring to FIGS. 2, and 10 through 14, with respect to each feature point FP included in a present macroblock MBe, the vector calculation unit 120 extracts (S441) the block motion vectors Mve, MVa, MVb, MVc, MVd and MVd of the present macroblock MBe and neighboring macroblocks MBa, MBb, MBc and MBd adjacent to the present macroblock MBe.

The vector calculation unit 120 calculates (S442) temporal weight values Ta, Tb, To and Td representing temporal correlation between each feature point FP and the block motion vectors MVa, MVb, MVc and MVd of the neighboring macroblocks. For example, the temporal weight values MVa, MVb, MVc and MVd may be calculated as reciprocal values of differences between the frame number of a present frame including the present macroblock and the frame number of other frames including the neighboring macroblocks. If the feature point FP is located in the P frame of POC=h and the referred to macroblock RMB is located in the previous I or P frame of POC=k as illustrated in FIG. 13, the temporal weight may be set to the reciprocal value 1/(h−k) of the difference (h−k) between the frame numbers h and k. If the feature point FP is located in the B frame of POC=r and the referred to macroblock RMB1 is located in the previous I or P frame of POC=s as illustrated in FIG. 14, the temporal weight may be set to the reciprocal value 1/(r−s) of the difference (r−s) between the frame numbers r and s. In the same way, if the feature point FP is located in the B frame of POC=r and the referred to macroblock RMB2 is located in the next I or P frame of POC=q as illustrated in FIG. 14, the temporal weight may be set to the reciprocal value 1/(q−r) of the difference (q−r) between the frame numbers q and r. The temporal weight value Te of the block motion vector MVe of the present macroblock MBe may be set to one.

The vector calculation unit 120 calculates (S443) scaled block motion vectors SMVa=Ta*MVa, SMVb=Tb*MVb, SMVc=Tc*MVc, SMVd=Td*MVd and SMVe=1*MVe by adjusting the extracted block motion vectors using the temporal weight values.

As described with reference to FIG. 10, also the vector calculation unit 120 calculates (S444) spatial weight values Wa, Wb, We, Wd and We representing spatial correlation between each feature point FP and the extracted block motion vectors MVa, MVb, MVc, MVd and MVe.

The vector calculation unit 120 calculates (S445) a weighted average value (Wa*SMVa+Wb*SMVb+Wc*SMV+Wd*SMV+W+e*SMVe)/(Wa+Wb+Wc+Wd+We) of the scaled block motion vectors SMVa, SMVb, SMVc, SMVd and SMVe using the spatial weight values Wa, Wb, We, Wd and We to determine the weighted average value as the point motion vector PMV of each feature point.

The point motion vector PMV may be determined exactly using the spatial weight values Wa, Wb, We, Wd and We and/or the temporal weight values Ta, Tb, Tc, Td and Te as described with reference to FIGS. 9 through 14.

Figure 15:
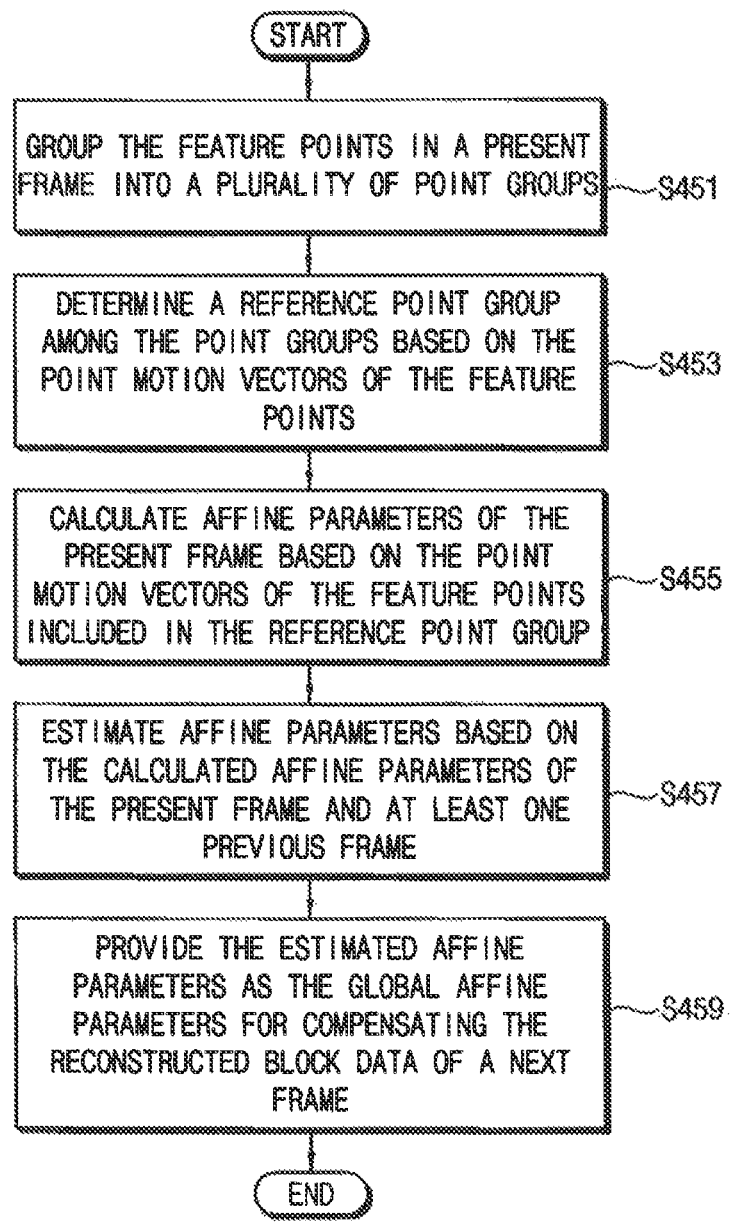
FIG. 15 is a flow chart illustrating a method of calculating global affine parameters according to an exemplary embodiment of the inventive concept.
Figure 16:
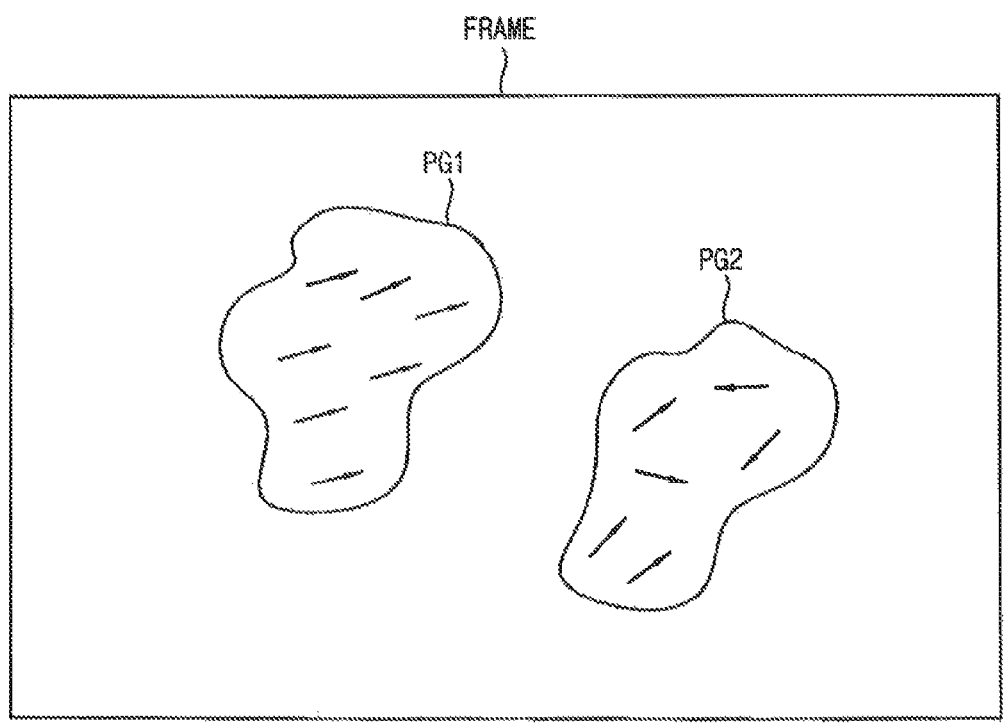
FIG. 16 is a diagram of motion vectors grouped in a video frame for describing a method of calculating global affine parameters through grouping of feature points according to an exemplary embodiment of the inventive concept.

FIG. 15 is a flow chart illustrating a method of calculating global affine parameters GAPs according to an exemplary embodiment of the inventive concept, and FIG. 16 is a diagram for describing a method of calculating global affine parameters through grouping of feature points according to an exemplary embodiment of the inventive concept.

Referring to FIGS. 2, 15 and 16, the affine parameter calculation unit 130 groups (S451) the feature points in a present frame into a plurality of point groups. FIG. 16 illustrates a non-limiting example of the distribution of the point motion vectors as arrows in a first point group PG1 and a second point group PG2. The number and shape of the point groups may be determined variously.

The affine parameter calculation unit 130 selects (S453) a reference point group among the point groups (e.g., PG1 and PG2) based on the point motion vectors of the feature points, such that the selected reference point group corresponds to the background in the frame (image). For example, the affine parameter calculation unit 130 calculates distribution values of the point groups, such that each distribution value represents direction and magnitude distribution of the point motion vectors of the feature points in each point group and compares the distribution values with a reference value. When the distribution value of the point group is smaller than the reference value, the affine parameter calculation unit 130 determines (selects) that point group as the reference point group. In the example of FIG. 16, the first point group PG1 having the smaller distribution value may be determined as the reference point group. As the distribution value is decreased, probability that the point group corresponds to the background increases. In contrast, as the distribution value is increased, the probability that the point group corresponds to an object moving in the background is increased.

The affine parameter calculation unit 130 calculates (S455) affine parameters AP of the present frame based on the point motion vectors of the feature points included in the reference point group. As such, the affine parameters AP may be calculated exactly by selecting the background and excluding the moving object.

In an exemplary embodiment, the trajectory unit 140 estimates (S457) affine parameters based on the calculated affine parameters AP of the present frame and at least one previous frame. The trajectory unit 140 may provides (S459) the estimated affine parameters as the global affine parameters GAP for compensating the reconstructed block data of a next frame.

In another exemplary embodiment, the trajectory unit 140 may be omitted. In that case, the calculated affine parameters AP of the present frame may be provided as the global affine parameters GAP for compensating the reconstructed block data of the next frame.

Figure 17:
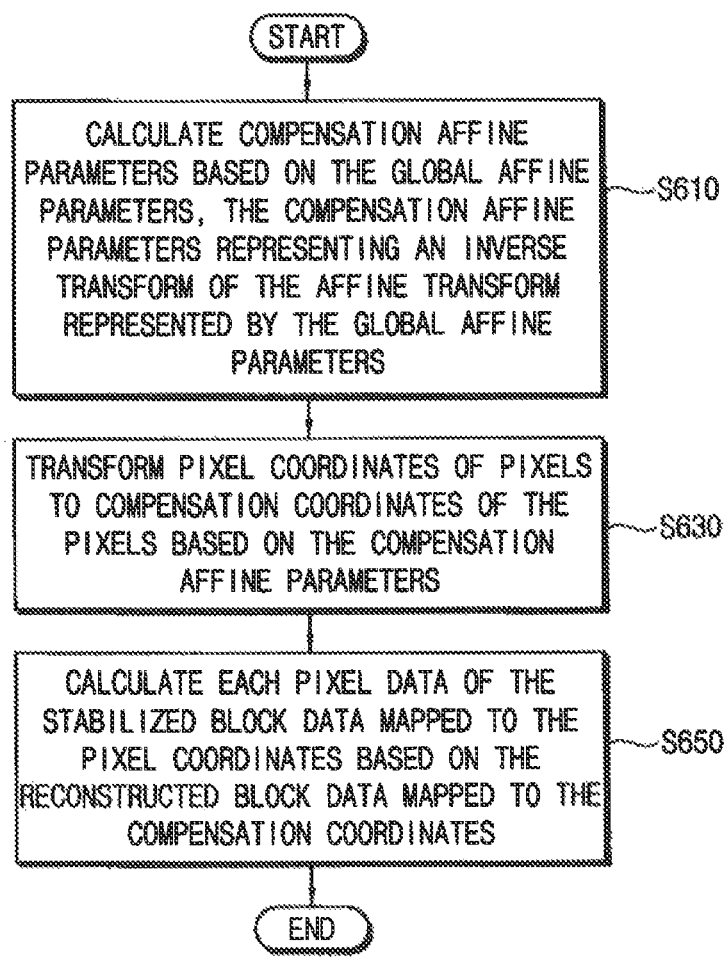
FIG. 17 is a flow chart illustrating a method of providing stabilized block data according to an exemplary embodiment of the inventive concept.
Figure 18:
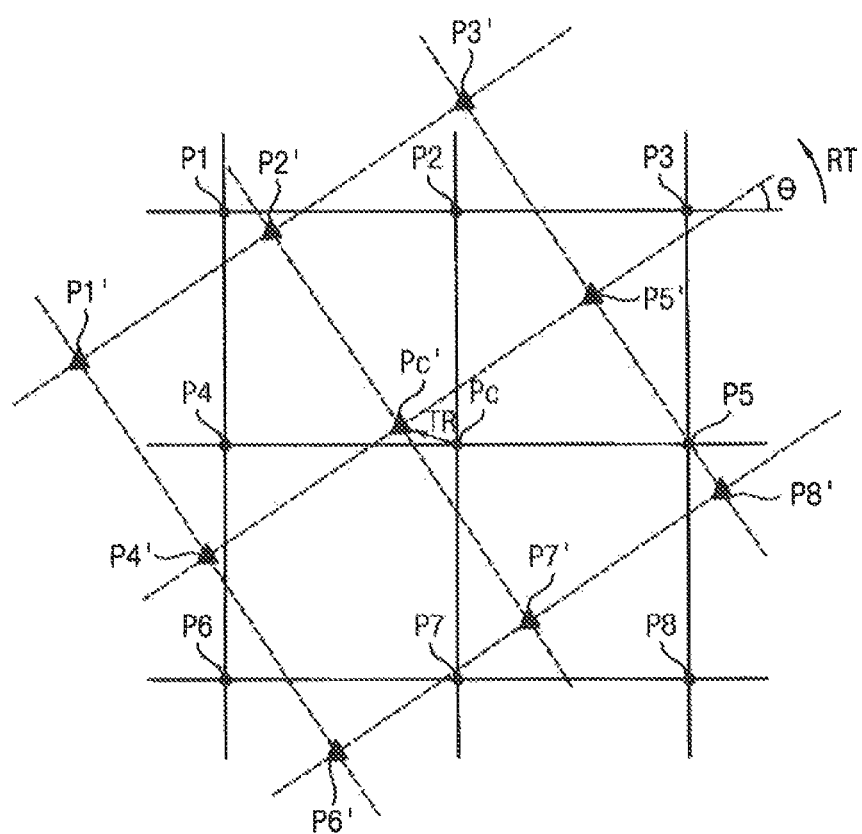
FIG. 18 is a diagram illustrating an example of an affine transform.

FIG. 17 is a flow chart illustrating a method of providing stabilized block data according to an exemplary embodiment of the inventive concept, and FIG. 18 is a diagram illustrating an example of an affine transform.

Referring to FIGS. 2, 17 and 18, the affine motion compensation unit 510 calculates (S610) compensation affine parameters CAP based on the global affine parameters GAP, where the compensation affine parameters CAP represent an inverse transform of the affine transform represented by the global affine parameters GAP. In general, the affine transform may be represented as a 2*2 matrix, and the global affine parameters may be the components of the matrix. In this case, the inverse transform may be represented as an inverse matrix of the 2*2 matrix, and the compensation affine parameters CAP may be the components of the inverse matrix.

The stabilized block data SBi may be calculated based on the compensation affine parameters CAP and the reconstructed block data MBi.

For example, the affine motion compensation unit 510 may transform (S630) pixel coordinates of pixels to compensation coordinates of the pixels based on the compensation affine parameters CAP. In FIG. 18, P1 through P8 and Pc indicate the pixel coordinates and P1' through P8' and Pc' indicate the corresponding compensation coordinates thereof. Using the compensation affine parameters CAP, the hand jitter noises may be compensated for where the hand jitter noises are represented by a translation TR and by a rotation RT in FIG. 18. Even though the change is not represented to scale in FIG. 18, the global affine parameters GAP shown are representative of the affine transform including all of the translation, the rotation and the scale change of the frame (image).

As further described with reference to FIGS. 19 and 20, the affine motion compensation unit 510 calculates (S650) each pixel data of the stabilized block data SBi mapped to the pixel coordinates P1 through P8 and Pc based on the reconstructed block data MBi mapped to the compensation coordinates P1' through P8' and Pc'.

Figure 19:
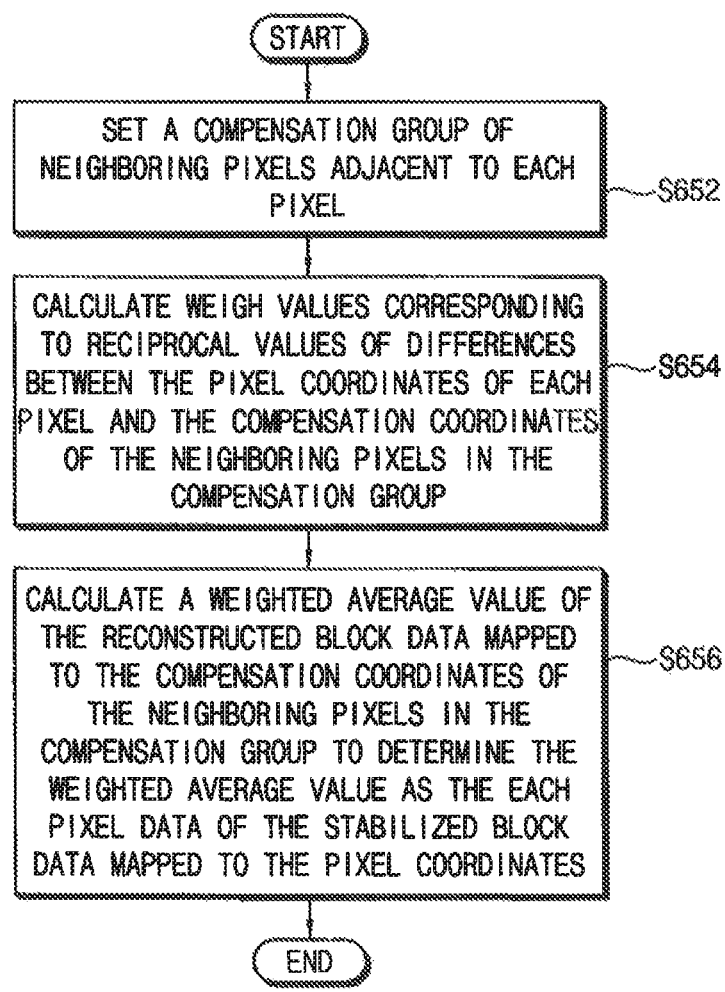
FIG. 19 is a flow chart illustrating a method of calculating each pixel data of stabilized block data according to an exemplary embodiment of the inventive concept.
Figure 20:
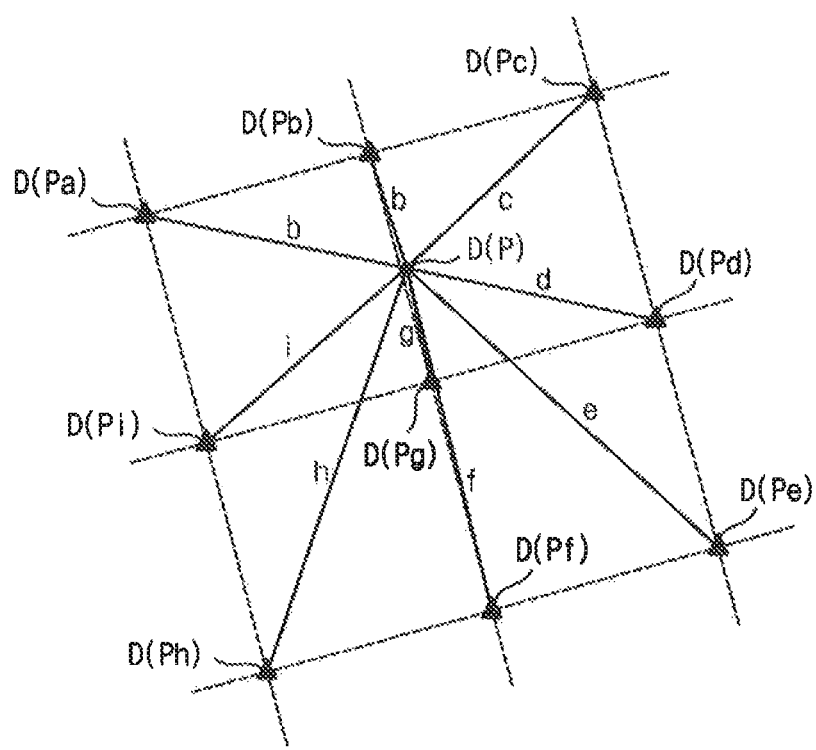
FIG. 20 is a diagram for describing compensation of pixel data by the method of FIG. 19.

FIG. 19 is a flow chart illustrating a method of calculating each pixel data of stabilized block data according to an exemplary embodiment of the inventive concept, and FIG. 20 is a diagram for describing compensation of pixel data by the method of FIG. 19.

Referring to FIGS. 2, 19 and 20, the affine motion compensation unit 510 sets a compensation group of neighboring pixels adjacent to (e.g., surrounding) each current pixel P. FIG. 20 illustrates a non-limiting example of the nine neighboring pixels in the compensation group and the number of the neighboring pixels may be selected variously. In FIG. 20, P indicates the current pixel coordinate of the one pixel and Pa, Pb, Pc, Pd, Pe, Pf, Pg, Ph and Pi indicate the compensation coordinates of the neighboring pixels. For example, the compensation group may be set based on the distance between the pixel coordinate and the compensation coordinates.

The affine motion compensation unit 510 calculates (S543) weight values Wa=1/a, Wb=1/b, Wc=1/c, Wd=1/d, We=1/e, Wf=1/f, Wg=1/g, Wh=1/h and corresponding to reciprocal values 1/a, 1/b, 1/c, 1/d, 1/e, 1/f, 1/g, 1/h and 1/i of differences a, b, c, d, e, f, g, h and i between the pixel coordinates P of each current pixel and the compensation coordinates Pa, Pb, Pc, Pd, Pe, Pf, Pg, Ph and Pi of the neighboring pixels in its compensation group.

The affine motion compensation unit 510 calculates (S656) a weighted average value SUM[Wk*D(Pk)]/SUM[Wk](k=a, b, c, d, e, f, g, h, i) of the reconstructed block data D(Pa), D(Pb), D(Pc), D(Pd), D(Pe), D(Pf), D(Pg), D(Ph) and D(Pi) mapped to the compensation coordinates Pa, Pb, Pc, Pd, Pe, Pf, Pg, Ph and Pi of the neighboring pixels in the compensation group to determine the weighted average value as the each pixel data D(P) of the stabilized block data mapped to the pixel coordinates P.

Figure 21:
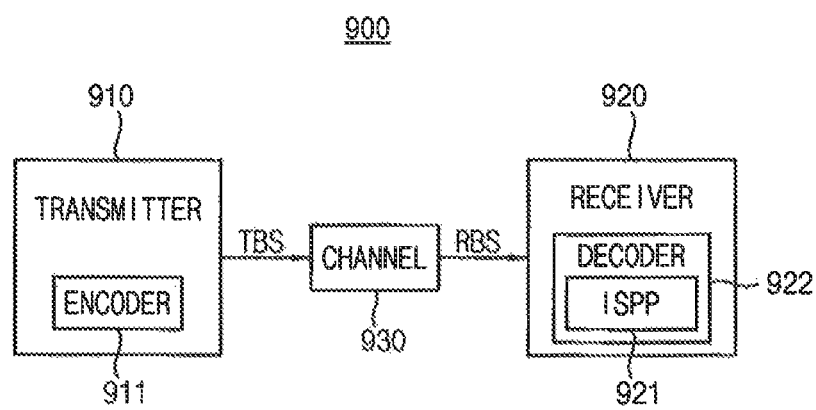
FIG. 21 is a block diagram of a communication system including a video decoder according to an exemplary embodiment of the inventive concept.

FIG. 21 is a block diagram of a communication system including a video decoder according to exemplary embodiments of the inventive concept.

Referring to FIG. 21, a communication system 900 includes a transmitter 910 including an encoder 911, a receiver 920 including a decoder 922 and a channel 930 between the transmitter 910 and the receiver 920.

The transmitter 910 outputs a transmission bit stream TBS encoded by the encoder 911 according to the predetermined standard such as H.264, to the channel 930. The receiver 920 receives a reception bit stream RBS, corresponding to the transmission bit stream TBS, from the channel 930 and the decoder 921 performs decoding processes on the reception bit stream RBS.

The decoder 922 includes an image stabilization post-processor (ISPP) 921 according to exemplary embodiments of the inventive concept. The post-processor 921 determines global affine parameters GAP based on the reconstructed block data MBi and the decoding information DINF where the global affine parameters GAP represent the affine transform of the frame (image), and provide the stabilized block data SBi based on the global affine parameters GAP by compensating the reconstructed block data MBi for the affine motion corresponding to the affine transform, as described above.

The channel 930 may be a wireless medium having a limited bandwidth. In case of a wireless channel, the transmission bit stream TBS is converted to a format proper for the wireless communication and the original bit stream TBS may be restored by the receiver 920 based on the reception bit stream RBS. In any case, there may be a data loss (e.g., bit errors) between the transmission bit stream TBS and the reception bit stream RBS. According to the flexible macroblock ordering (FMO) of H.264, the macroblocks are transmitted in a predetermined slice group order to enhance recovery of the lost data. The decoder 921 may restore the loss of one slice group or macroblock using the macroblocks in another slice group.

Figure 22:
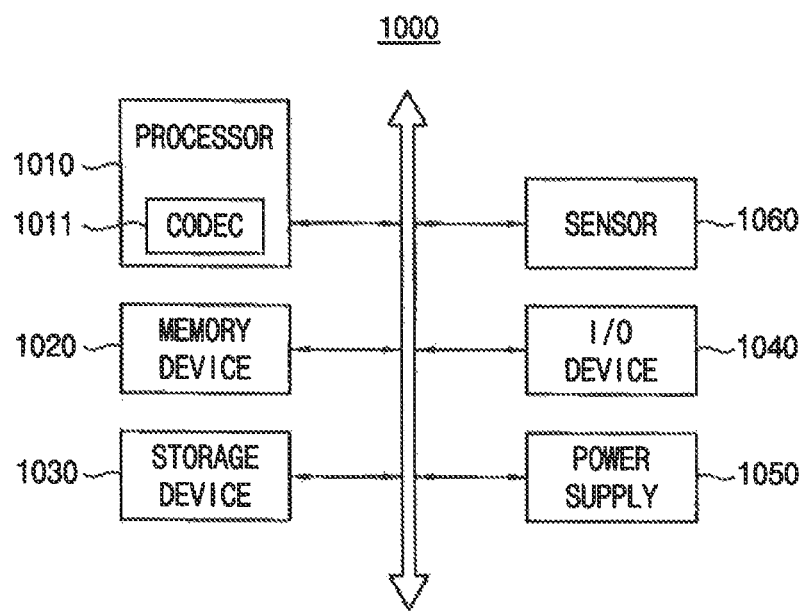
FIG. 22 is a block diagram of a computer system including a video decoder according to an exemplary embodiment of the inventive concept.

FIG. 22 is a block diagram illustrating a computer system including a video decoder according to exemplary embodiments of the inventive concept.

Referring to FIG. 22, a computing system 1000 includes a processor 1010, a memory device 1020, a storage device 1030, an input/output device 1040, a power supply 1050, and an image sensor 1060. Although it is not shown in FIG. 22, the computing system 1000 may further include ports of a known type that communicate with a video card, a sound card, a memory card, a universal serial bus (USB) device, and/or other electronic devices.

The processor 1010 may perform various calculations or tasks. The processor 1010 includes a video coder/decoder (codec) 1011. The codec 1011 may include the video decoder and/or executable code for performing the method according to exemplary embodiments as described with reference to FIGS. 1 through 20. In addition, the codec 1011 may include a video encoder for encoding the data that are provided to the video decoder. In an exemplary embodiment, the video encoder and the video decoder may be merged in the same semiconductor integrated circuit and/or the corresponding software. According to various embodiments, the processor 1010 may be a microprocessor or a central processing unit (CPU). The processor 1010 communicates with the memory device 1020, the storage device 1030, and the input/output device 1040 via an address bus, a control bus, and/or a data bus. In some exemplary embodiments, the processor 1010 may be coupled to an extended bus, such as a peripheral component interconnection (PCI) bus. The memory device 1020 stores data for operating the computing system 1000. For example, the memory device 1020 may be implemented with a dynamic random access memory (DRAM) device, a mobile DRAM device, a static random access memory (SRAM) device, a phase random access memory (PRAM) device, a ferroelectric random access memory (FRAM) device, a resistive random access memory (RRAM) device, and/or a magnetic random access memory (MRAM) device. The storage device may include a solid state drive (SSD), a hard disk drive (HDD), a compact-disc read-only memory (CD-ROM), etc. The input/output device 1040 may include an human user input device (e.g., a keyboard, a keypad, a mouse, etc.) and an output device (e.g., a printer, a display device, etc.). The power supply 1050 supplies voltages for operating the computing system 1000.

The image sensor 1060 communicates with the processor 1010 via the buses or other communication links. The image sensor 1060 may be integrated with the processor 1010 in one semiconductor chip, or the image sensor 1060 and the processor 1010 may be implemented as separate chips.

The computing system 1000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), system in package (SIP), multi-chip package (MCP), wafer-level fabricated package (WFP), or wafer-level processed stack package (WSP).

The computing system 1000 may be any computing system using a three-dimensional image sensor. The computing system 1000 may include a digital camera, a mobile phone, a smart phone, a portable multimedia player (PMP), a personal digital assistant (PDA), etc.

FIG. 23 illustrates a block diagram of an interface employable in the computing system of FIG. 22 according to exemplary embodiments of the inventive concept.

Referring to FIG. 23, a computing system 1100 may be implemented by a data processing device that uses or supports a mobile industry processor interface (MIPI®) interface. The computing system 1100 may include an application processor 1110, a three-dimensional image sensor 1140, a display device 1150, etc. A camera serial interface (CSI) host 1112 of the application processor 1110 performs a serial communication with a CSI device 1141 of the three-dimensional image sensor 1140 via a camera serial interface (CSI). The CSI host 1112 includes a deserializer (DES), and the CSI device 1141 includes a serializer (SER). A display serial Interface (DSI) host 1111 of the application processor 1110 performs a serial communication with a DSI device 1151 of the display device 1150 via a display serial interface (DSI).

The DSI host 1111 includes a serializer (SER), and the DSI device 1151 includes a deserializer (DES). The computing system 1100 may further include a radio frequency (RF) chip 1160 performing a communication with the application processor 1110. A physical layer (PHY) 1113 of the computing system 1100 and a physical layer (PHY) 1161 of the RF chip 1160 may perform data communications based on a MIPI® DigRFSM. The application processor 1110 may further include a DigRFSM MASTER 1114 that controls the data communications of the PHY 1161.

The computing system 1100 may further include a global positioning system (GPS) 1120, a storage 1170, a MIC 1180, a DRAM device 1185, and a speaker 1190. In addition, the computing system 1100 may perform communications using an ultra-wideband (UWB) 1210, a wireless local area network (WLAN) 1220, a worldwide interoperability for microwave access (WIMAX) 1230, etc. However, the structure and the interface of the computing system 1100 are not limited thereto.

As will be appreciated by one skilled in the art, embodiments of the present invention may be embodied as an application-specific hardware system or chip, a method, a computer program product, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

Some exemplary embodiments of the inventive concept may be applied to arbitrary devices and/or systems that encode and decode video data. Particularly some exemplary embodiments of the inventive concept may be applied to a video decoder that is compatible with the standards such MPEG, H.261, H.262, H.263 and H.264. Some exemplary embodiments of the inventive concept may be adopted in technical fields such as CATV (Cable TV on optical networks, copper, etc.), DBS (Direct broadcast satellite video services), DSL (Digital subscriber line video services), DTTB (Digital terrestrial television broadcasting), ISM (Interactive storage media (optical disks, etc.)), MMM (Multimedia mailing), MSPN (Multimedia services over packet networks), RTC (Real-time conversational services (videoconferencing, videophone, etc.)), RVS (Remote video surveillance), SSM (Serial storage media (digital VTR, etc.))

The foregoing is illustrative of exemplary embodiments of the inventive concept and is not to be construed as limiting thereof. Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and the inventive concept is not to be construed as limited to the specific exemplary embodiments disclosed, and that modifications to the disclosed exemplary embodiments, as well as other exemplary embodiments, are intended to be included within the scope of the appended claims.

What is claimed is:

1. A method of stabilizing video, comprising:
   receiving reconstructed Hock data and decoding information of a video frame by unit of macroblock from a decoding circuit;
   providing global affine parameters based on the reconstructed block data and the decoding information, the global affine parameters representing an affine transform of one frame;
   providing stabilized block data based on the global affine parameters by compensating the reconstructed block data for an affine motion corresponding to the affine transform,
   wherein the stabilized block data includes a plurality of pixels, each of the plurality of pixels having pixel data,
   providing the stabilized block data includes calculating each pixel data of the stabilized data, and
   calculating each pixel data of the stabilized block data includes:
   setting a compensation group of neighboring pixels adjacent to each pixel;
   calculating weight values corresponding to reciprocal values of differences between pixel coordinates of each pixel and compensation coordinates of the neighboring pixels in the compensation group; and
   calculating a weighted average value of the reconstructed block data mapped to the compensation coordinates of the neighboring pixels in the compensation group to determine the weighted average value as the each pixel data of the stabilized block data mapped to the pixel coordinates,
   wherein the compensation coordinates of the neighboring pixels are pixel coordinates of the neighboring pixels that are transformed based on the global affine parameters.

2. The method of claim 1, wherein the global affine parameters represent the affine transform including all of a translation, a rotation and a scale change of the frame.

3. The method of claim 1, wherein providing the global affine parameters includes;
   calculating motion vectors of feature points based on the reconstructed block data and the decoding information, the feature points representing edges or corners of objects included in the frame; and
   determining the global affine parameters by unit of frame based on the feature point motion vectors.

4. The method of claim 3, wherein the feature point motion vectors are calculated by analyzing, based on a raster-scan order, the reconstructed block data of a plurality of macroblocks in each frame.

5. The method of claim 3, wherein calculating the feature point motion vectors includes:
   detecting the feature points by analyzing the reconstructed block data; and
   calculating the motion vectors of the feature points based on block motion vectors of macroblocks, the block motion vectors being included in the decoding information from the decoding circuit.

6. The method of claim 5, wherein detecting the feature points includes:
   determining whether or not to perform the detection of the feature points with respect to each macroblock based on an encoding mode of the macroblock.

7. The method of claim 6, wherein determining whether or not to perform the detection of the feature points includes:
   omitting to perform the detection of the feature points with respect to a macroblock the encoding of which is an intra mode.

8. The method of claim 6, wherein determining whether or not to perform the detection of the feature points includes:
   calculating a magnitude of residual block data of each macroblock of which the encoding mode is an inter mode, the residual block data being included in the decoding information; and
   omitting to perform the detection of the feature points with respect to the macroblock if the magnitude of the residual block data of the macroblock is larger than a reference value.

9. The method of claim 8 wherein calculating the magnitude of the residual block data includes:
   calculating absolute values of pixel data in the residual block data of each macroblock; and
   calculating a sum of the absolute values to use the sum as the magnitude of the residual block data of each macroblock.

10. The method of claim 3, wherein calculating the feature point motion vectors is omitted if a present frame is an intra frame.

11. The method of claim 5, wherein calculating the point motion vectors of the feature points includes:
    with respect to each feature point included in a present macroblock, extracting the block motion vectors of the present macroblock and neighboring macroblocks adjacent to the present macroblock;
    calculating spatial weight values representing spatial correlation between each feature point and the extracted block motion vectors; and
    calculating a weighted average value of the extracted block motion vectors using the spatial weight values to determine the weighted average value as the motion vector of each feature point.

12. The method of claim 11, wherein the spatial weight values are calculated as reciprocal values of distances between each feature point and center points of the reference macroblock and of the neighboring macroblocks.

13. The method of claim 5, wherein calculating the point motion vectors of the feature points includes:

with respect to each feature point included in a present macroblock, extracting the block motion vectors of the present macroblock and of neighboring macroblocks adjacent to the present macroblock;

calculating temporal weight values representing temporal correlation between each feature point and the block motion vectors of the neighboring macroblocks; and calculating scaled block motion vectors by adjusting the extracted block motion vectors using the temporal weight values;

calculating spatial weight values representing spatial correlation between each feature point and the extracted block motion vectors; and calculating a weighted average value of the scaled block motion vectors using the spatial weight values to determine the weighted average value as the point motion vector of each feature point.

14. The method of claim 13, wherein the temporal weight values are calculated as reciprocal values of differences between a frame number of a present frame including the present macroblock and frame numbers of other frames including the neighboring macroblocks.

15. The method of claim 3, wherein determining the global affine parameters by unit of frame includes:

grouping the feature points in a present frame into a plurality of point groups;

selecting a reference point group among the point groups based on the point motion vectors of the feature points; and calculating affine parameters of the present frame based on the point motion vectors of the feature points included in the reference point group.

16. The method of claim 15, wherein determining the reference point group includes:

calculating distribution values of the point groups, each distribution value representing direction and magnitude distribution of the point motion vectors of the feature points in each point group;

comparing the distribution values with a reference value; and determining the point group as the reference point group when the distribution value of the point group is smaller than the reference value.

17. The method of claim 15, wherein determining the global affine parameters by unit of frame further includes:

providing the calculated affine parameters of the present frame as the global affine parameters for compensating the reconstructed block data of a next frame.

18. The method of claim 15, wherein determining the global affine parameters by unit of frame further includes:

estimating affine parameters based on the calculated affine parameters of the present frame and at least one previous frame; and providing the estimated affine parameters as the global affine parameters for compensating the reconstructed block data of a next frame.

19. The method of claim 1, wherein providing the stabilized block data further includes:

calculating compensation affine parameters based on the global affine parameters, the compensation affine parameters representing an inverse transform of the affine transform represented by the global affine parameters.

20. The method of claim 19, wherein providing the stabilized block data further includes:

transforming pixel coordinates of pixels to compensation coordinates of the pixels based on the compensation affine parameters.

* * * * *